United States Patent
Naganuma et al.

(10) Patent No.: US 8,314,951 B2
(45) Date of Patent: Nov. 20, 2012

(54) IMAGE PROCESSING APPARATUS, AND COMPUTER-READABLE RECORDING MEDIUM

(75) Inventors: Yuzuru Naganuma, Osaka (JP); Yoshinori Minakata, Osaka (JP)

(73) Assignee: Kyocera Document Solutions Inc. (JP)

( * ) Notice: Subject to any disclaimer, the term of this patent is extended or adjusted under 35 U.S.C. 154(b) by 545 days.

(21) Appl. No.: 12/586,748

(22) Filed: Sep. 25, 2009

(65) Prior Publication Data
US 2010/0079783 A1    Apr. 1, 2010

(30) Foreign Application Priority Data

| Sep. 26, 2008 | (JP) | 2008-248226 |
| Sep. 29, 2008 | (JP) | 2008-251313 |
| Sep. 29, 2008 | (JP) | 2008-251314 |
| Sep. 29, 2008 | (JP) | 2008-251315 |
| Sep. 30, 2008 | (JP) | 2008-253942 |
| Sep. 30, 2008 | (JP) | 2008-253943 |

(51) Int. Cl.
*G06F 15/00* (2006.01)
*G06K 9/54* (2006.01)
(52) U.S. Cl. .................... 358/1.13; 382/305
(58) Field of Classification Search .................. 358/1.13
See application file for complete search history.

(56) References Cited

U.S. PATENT DOCUMENTS

| 2003/0218766 | A1* | 11/2003 | Matsumoto | 358/1.13 |
| 2006/0279758 | A1  | 12/2006 | Myoki | |
| 2008/0168342 | A1* | 7/2008  | Shur et al. | 715/229 |
| 2009/0150873 | A1  | 6/2009  | Taneda | |

FOREIGN PATENT DOCUMENTS

| JP | H08-087406 | 4/1996 |
| JP | 2003-216960 | 7/2003 |
| JP | 2004-192471 | 8/2004 |
| JP | 2004-295857 | 10/2004 |
| JP | 2007-164526 | 6/2007 |
| WO | WO2008/040188 | 4/2008 |

OTHER PUBLICATIONS

XML Paper Specification, XPS Specification and Reference Guide, Base Document, Working Draft 1.0.1 Submitted to ECMA TC46 by Microsoft, Sep. 2007.

* cited by examiner

*Primary Examiner* — Saeid Ebrahimi Dehkordy
(74) *Attorney, Agent, or Firm* — Stephen Chin

(57) ABSTRACT

An image processing apparatus contains an alpha-blend execution unit and a storage device management unit. The alpha-blend execution unit allocates a memory area in a main memory for an alpha-blend execution to compose transparency properties and carries out the alpha-blend execution in a process to convert a page description language data to an image. The page description language data contains a drawing object having a transparency property and a canvas having a transparency property. The drawing object is drawn on the canvas. The storage device management unit evacuates a memory-image of the canvas in the memory area from the main memory to an auxiliary memory, and reads back the memory-image of the canvas from the auxiliary memory to the main memory when the memory-image of the canvas is required for the alpha-blend execution.

22 Claims, 16 Drawing Sheets

FIG. 1

```
                As        Cs
<Path          /         /
Fill = "#80 FF0000"
                                    Oe
Data = "M 100.0,100.0 L 200.0,100.0 L 200.0,200.0 L 100.0,200.0 Z"
Opacity = "0.5">
<Path.OpacityMask>
        <LinearGradientBrush
            StartPoint="100,100" EndPoint="200,200"
            MappingMode="Absolute">
                <LinearGradientBrush.GradientStops>                        Om
                        <GradientStop Color="#FF000000" Offset="0" />
                        <GradientStop Color="#80000000" Offset="1" />
                </LinearGradientBrush.GradientStops>
        </LinearGradientBrush>
</Path.OpacityMask>
</Path>
```

FIG. 6A
```
Canvas1
       Canvas2      Object1           Object2    Object3
                    Rectangle         Triangle   Triangle
<Canvas Opacity = "0.5">
    <Path Fill = "#FFFF00" Data = "M 10,10 L 50,10 L 50,90 L 10,90 Z"/>
    < Canvas Opacity = "0.5">
        <Path Fill = "#8000FF00" Data = "M 30,20 L 20,65 L 80,65 Z"/>
        <Path Fill = "#80000FF" Data = "M 60,80 L 20,35 L 80,35 Z"/>
    </Canvas>
</Canvas>
```
FIG. 6B
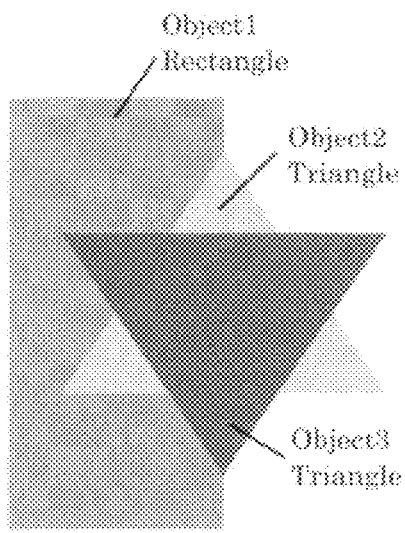
FIG. 6C
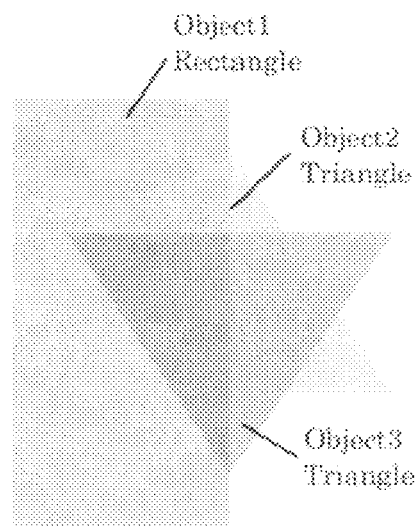

AN IMAGE IN A LAYER WHERE DRAWING PROCESS IS BEING PERFORMED

AN IMAGE MAINTAINED UNTIL AN UPPER LAYER IS OVERLAPPED ON THIS LAYER

AN IMAGE MAINTAINED UNTIL AN UPPER LAYER IS OVERLAPPED ON THIS LAYER

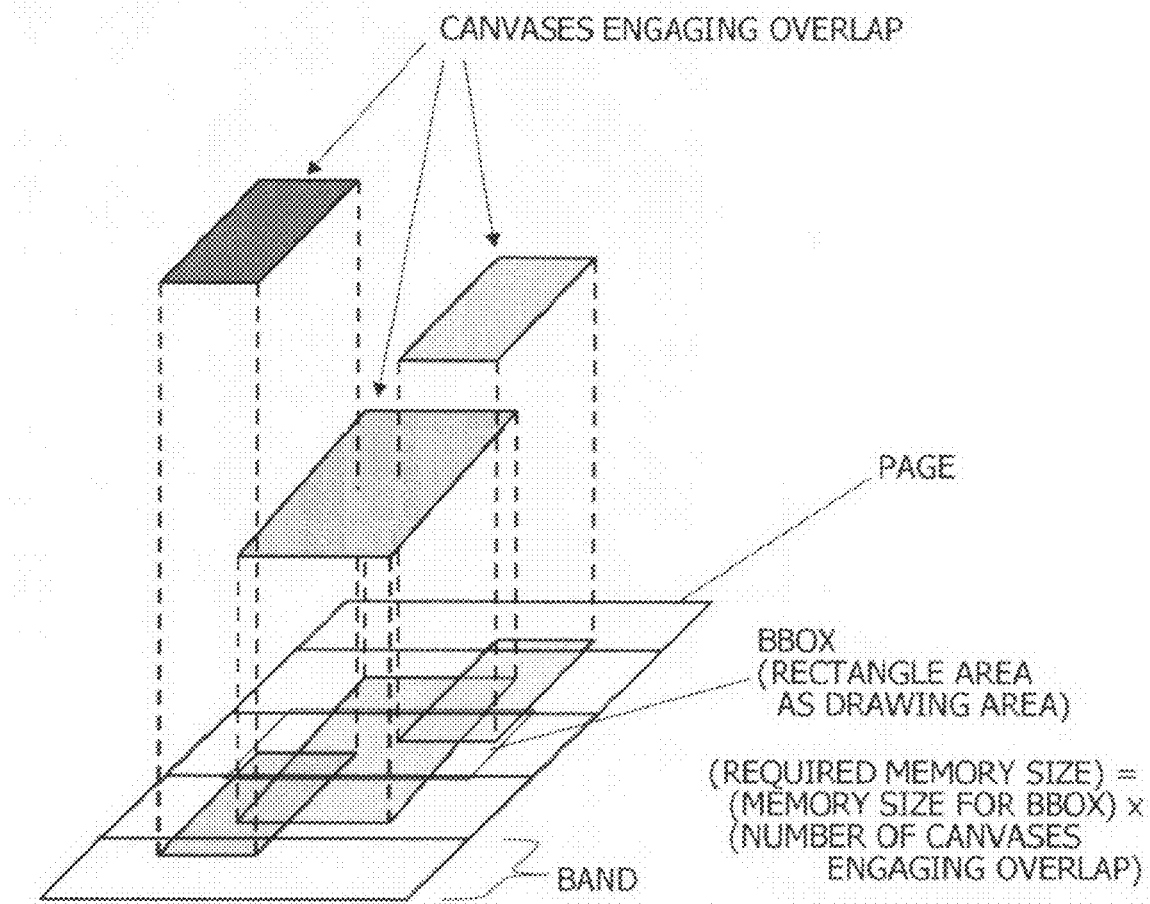

IMAGE PROCESSING APPARATUS, AND COMPUTER-READABLE RECORDING MEDIUM

CROSS-REFERENCE TO RELATED APPLICATIONS

This application relates to and claims priority rights from Japanese Patent Applications:
No. 2008-248226, filed on Sep. 26, 2008,
No. 2008-251313, filed on Sep. 29, 2008,
No. 2008-251314, filed on Sep. 29, 2008,
No. 2008-251315, filed on Sep. 29, 2008,
No. 2008-253942, filed on Sep. 30, 2008, and
No. 2008-253943, filed on Sep. 30, 2008,
the entire disclosures of which are hereby incorporated by reference herein.

BACKGROUND OF THE INVENTION

1. Field of the Invention

This invention relates to an image processing apparatus, and a computer-readable recording medium.

2. Description of the Related Art

According to a page description language such as XPS (XML Paper Specification) that is extended from XML (Extensible Markup Language), a drawing object (i.e. path, font, image, or the like) having a transparency property and a canvas having a transparency property may exist in layers and engage overlap. The canvas is a basis on which the drawing object is drawn. When the transparency properties of the drawing object and the canvas are composed, it is necessary to carry out an alpha-blend execution after allocating a memory area to carry out the alpha-blend execution for each layer.

Since different rendering results are obtained by compressing a color space to a device color space before an alpha-blend execution and by compressing a color space to a device color space after an alpha-blend execution, a conventional technique chooses an appropriate order of a color space compression and an alpha-blend execution.

SUMMARY OF THE INVENTION

An image processing apparatus according to an aspect of this invention contains: an alpha-blend execution unit that allocates a memory area in a main memory for an alpha-blend execution to compose transparency properties and carries out the alpha-blend execution in a process to convert a page description language data to an image, the page description language data containing a drawing object having a transparency property and a canvas having a transparency property, the drawing object drawn on the canvas; and a storage device management unit that evacuates a memory-image of the canvas in the memory area from the main memory to an auxiliary memory, and reads back the memory-image of the canvas from the auxiliary memory to the main memory when the memory-image of the canvas is required for the alpha-blend execution.

A computer-readable recording medium according to an aspect of this invention, in which an image processing program is stored; the image processing program instructs a computer to function as: an alpha-blend execution unit that allocates a memory area in a main memory for an alpha-blend execution to compose transparency properties and carries out the alpha-blend execution in a process to convert a page description language data to an image, the page description language data containing a drawing object having a transparency property and a canvas having a transparency property, the drawing object drawn on the canvas; and a storage device management unit that evacuates a memory-image of the canvas in the memory area from the main memory to an auxiliary memory, and reads back the memory-image of the canvas from the auxiliary memory to the main memory when the memory-image of the canvas is required for the alpha-blend execution.

An image processing apparatus according to another aspect of this invention contains: a transparency setting checking unit that identifies transparency properties of canvases in a process to convert a page description language data to an image, the page description language data containing drawing objects having transparency properties and canvases having transparency properties, the drawing objects drawn on the canvases; and a drawing unit that allocates a memory area for an alpha-blend execution to compose the transparency properties and carries out the alpha-blend execution if any of the transparency properties of the canvases indicates transparent or translucent, and carries out a drawing process directly to a page memory without allocating a memory area for the alpha-blend execution if all of the transparency properties indicate opaque.

Here, a "canvas" means an object as a basis on which a drawing object (i.e. path, font, image, or the like) is drawn, and has transparency value that indicates a degree of transparency, and a transparency property such as transparency mask that has a transparency distribution. Further, "transparent" means that a degree of transparency is zero, "opaque" means that a degree of transparency is 1.0, and "translucent" means that a degree of transparency is less than 1.0 and more than 0.

A computer-readable recording medium according to another aspect of this invention, in which an image processing program is stored; the image processing program instructs a computer to function as: a transparency setting checking unit that identifies transparency properties of canvases in a process to convert a page description language data to an image, the page description language data containing drawing objects having transparency properties and canvases having transparency properties, the drawing objects drawn on the canvases; and a drawing unit that allocates a memory area for an alpha-blend execution to compose the transparency properties and carries out the alpha-blend execution if any of the transparency properties of the canvases indicates transparent or translucent, and carries out a drawing process directly to a page memory without allocating a memory area for the alpha-blend execution if all of the transparency properties indicate opaque.

An image processing apparatus according to another aspect of this invention contains: a canvas checking unit that identifies a canvas that does not have any drawing objects thereon and a transparency property thereof indicates opaque in a process to convert a page description language data to an image, the page description language data containing drawing objects having transparency properties and canvases having transparency properties, the drawing objects drawn on the canvases; and a drawing data converter unit that excludes the canvas identified by the canvas checking unit from the canvases in the page description language data to be converted to an image.

Here, a "canvas" means an object as a basis on which a drawing object (i.e. path, font, image, or the like) is drawn, and has transparency value that indicates a degree of transparency, and a transparency property such as transparency mask that has a transparency distribution. Further, "opaque" means that a degree of transparency is 1.0.

A computer-readable recording medium according to another aspect of this invention, in which an image processing program is stored; the image processing program instructs a computer to function as: a canvas checking unit that identifies a canvas that does not have any drawing objects thereon and a transparency property thereof indicates opaque in a process to convert a page description language data to an image, the page description language data containing drawing objects having transparency properties and canvases having transparency properties, the drawing objects drawn on the canvases; and a drawing data converter unit that excludes the canvas identified by the canvas checking unit from the canvases in the page description language data to be converted to an image.

An image processing apparatus according to another aspect of this invention contains: a canvas checking unit that determines whether or not a transparency property of a canvas indicates opaque, and considers each canvas in a series of continuous opaque canvases from the first canvas to be an "extrinsic canvas," and considers a canvas other than the opaque canvases to be an "intrinsic canvas," in a process to convert a page description language data to an image, the page description language data containing drawing objects having transparency properties and canvases having transparency properties, the drawing objects drawn on the canvases; and a drawing unit that carries out a drawing process directly to a page memory for drawing to the "extrinsic canvas," and carries out a drawing process with an alpha-blend execution for drawing to the "intrinsic canvas."

Here, a "canvas" means an object as a basis on which a drawing object (i.e. path, font, image, or the like) is drawn, and has transparency value that indicates a degree of transparency, and a transparency property such as transparency mask that has a transparency distribution. Further, "opaque" means that a degree of transparency is 1.0.

A computer-readable recording medium according to another aspect of this invention, in which an image processing program is stored; the image processing program instructs a computer to function as: a canvas checking unit that determines whether or not a transparency property of a canvas indicates opaque, and considers each canvas in a series of continuous opaque canvases from the first canvas to be an "extrinsic canvas," and considers a canvas other than the opaque canvases to be an "intrinsic canvas," in a process to convert a page description language data to an image, the page description language data containing drawing objects having transparency properties and canvases having transparency properties, the drawing objects drawn on the canvases; and a drawing unit that carries out a drawing process directly to a page memory for drawing to the "extrinsic canvas," and carries out a drawing process with an alpha-blend execution for drawing to the "intrinsic canvas."

An image processing apparatus according to another aspect of this invention contains: a drawing area calculating unit that calculates coordinate information on a rectangle area where a drawing object and a canvas are drawn from coordinate values of the drawing object and the canvas, in a process to convert a page description language data to an image, the page description language data containing a drawing object having a transparency property and a canvas having a transparency property, the drawing object drawn on the canvas; and a drawing unit that carries out composition of the transparency properties only in the rectangle area specified by the coordinate information.

Here, a "canvas" means an object as a basis on which a drawing object (i.e. path, font, image, or the like) is drawn, and has transparency value that indicates a degree of transparency, and a transparency property such as transparency mask that has a transparency distribution.

A computer-readable recording medium according to another aspect of this invention, in which an image processing program is stored; the image processing program instructs a computer to function as: a drawing area calculating unit that calculates coordinate information on a rectangle area where a drawing object and a canvas are drawn from coordinate values of the drawing object and the canvas, in a process to convert a page description language data to an image, the page description language data containing a drawing object having a transparency property and a canvas having a transparency property, the drawing object drawn on the canvas; and a drawing unit that carries out composition of the transparency properties only in the rectangle area specified by the coordinate information.

An image processing apparatus according to another aspect of this invention contains: an intermediate language converter unit that converts page description language data in which a canvas having a transparency property exists in a nest structure to intermediate language data with maintaining the nest structure, in a process to convert the page description language data to the intermediate language data.

Here, a "canvas" means an object as a basis on which a drawing object (i.e. path, font, image, or the like) is drawn, and has transparency value that indicates a degree of transparency, and a transparency property such as transparency mask that has a transparency distribution.

A computer-readable recording medium according to another aspect of this invention, in which an image processing program is stored; the image processing program instructs a computer to function as: an intermediate language converter unit that converts page description language data in which a canvas having a transparency property exists in a nest structure to intermediate language data with maintaining the nest structure, in a process to convert the page description language data to the intermediate language data.

These and other objects, features and advantages of the present invention will become more apparent upon reading of the following detailed description along with the accompanied drawings.

BRIEF DESCRIPTION OF THE DRAWINGS

FIG. 1 shows an instance of an expression of an alpha value, a color value, a degree of transparency, and transparency mask in XPS;

FIGS. 6A to 6C show an instance of an expression of a nested canvas in XPS (FIG. 6A), and screens corresponding to the canvas without a transparency setting (FIG. 6B) and with a transparency setting (FIG. 6C).

FIG. 16 shows a diagram for explaining determination of a drawing area in Embodiment 5.

DETAILED DESCRIPTION OF THE PREFERRED EMBODIMENT

Embodiment 1

Figure 2A:
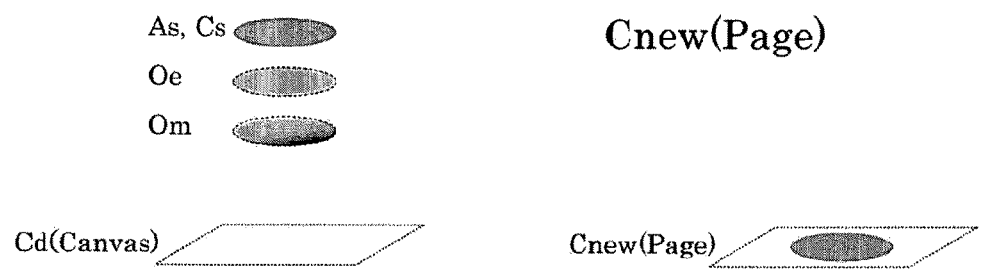
FIGS. 2A and 2B show a schematic diagram of alpha-blend carried out with a drawing process to a canvas (without a transparency setting)

In the following part, an image processing apparatus according to Embodiment 1 of this invention will be explained.

Composing Transparency Properties, i.e. Alpha Blend

"Alpha blend" means to carry out translucent composition of two images that have respective color values with a coefficient. This coefficient is called as "alpha value", which is a value from 0.0 to 1.0. The value 0.0 means transparent overlap, and the value 1.0 means opaque overlap. A value more than 0.0 and less than 1.0 means translucent. In PDF (Portable Document Format) and XPS (XML Paper Specification) document format, an alpha value can be set to an object such as a figure by paths, a font or an image, and an alpha blend of the object and a groundwork color can be carried out in a drawing process.

In the following part, a composition process of degrees of transparency in an alpha blend will be explained with an instance of XPS document format data.

FIG. 1 shows Path data having a transparency property described in XPS. Steps are strictly performed in an alpha blend described in "11.4 Opacity Computations" of XPS Specification 1.0 as follows.

Blend Step #1:

An alpha value of a source is identified; and the alpha value is multiplied by a value of Opacity attribute and a value of OpacityMask.

$$As1 = As*Oe*Om$$

As: alpha value of a source element (see FIG. 1)
Oe: Opacity value of a source element (see FIG. 1)
Om: OpacityMask value of a source element in a position of a pixel to be drawn (see FIG. 1)

Blend Step #2:

A color value of the source is multiplied by the alpha value As1 calculated in Blend Step #1. This execution is called as "Pre-multiply source alpha." In a mathematical expression described below, Cs is a value corresponding a plane in a current color space such as RGB, Gray or CMYK.

$$Cs\_tmp = Cs*As1$$

Cs: color value of a source (see FIG. 1)
Cs_tmp: temporal value of a color value in the source side Blend Step #3:

A color value of a destination is multiplied by an alpha value in the destination. This execution is called as "Pre-multiply destination alpha." In a mathematical expression described below, a pixel color value Cd in the destination is a value corresponding a plane in a current color space such as RGB, Gray or CMYK, as well as Cs.

$$Cd\_tmp = Cd*Ad$$

Ad: alpha value of a destination
Cd: color value of a pixel to be drawn in the destination
Cd_tmp: temporal value of a color value in the destination side Blend Step #4:

A blend process is carried out.

$$A\_tmp = (1-As1)*Ad+As1$$

$$C\_tmp = (1-As1)*Cd\_tmp+Cs\_tmp$$

A_tmp: temporary variable in Blend Step #5
C_tmp: temporary variable in Blend Step #5

Blend Step #5:

A value to write as a destination result is calculated. This execution is "Reverse pre-multiplication."

```
If A_tmp = 0
{
    Anew = Cnew = 0
}
Else
{
    Anew = A_tmp
    Cnew = min(C_tmp / A_tmp, 1)
}
```

Parameters in Blend Steps #1 and #2 are in the XPS document shown in FIG. 1 (see XML Paper Specification, XPS Specification and Reference Guide Version 1.0 for detail)

[Case A: Drawing Process to a Page]

In a drawing process to a page carried out in Blend Step #3, a groundwork may be opaque, that is, it may be that $Ad=1.0$. If the groundwork is opaque, an alpha blend is processed only with a color value and an alpha value in a source and a destination color value that has been drawn in a page (see FIG. 2A) as follows.

$$As1 = As*Oe*Om$$

Anew=1.0 (opaque, without changing)

Cnew=$(1-As1)*Cd+As1*Cs$ (known as an alpha-blend expression)

[Case B: A Canvas does not have a Transparency Property]

In a drawing process to a canvas carried out in Blend Step #3, a groundwork may be transparent at an initial state, that is, it may be that Ad=0.0 without a color and Cd=0.0 (black in RGB). This is like a glass board.

$$As1 = As*Oe*Om$$

Anew=As1 (alpha value is piled up)

Cnew=Cs (source color value is used as it is)

If blend process step is carried out when anything is not drawn on a canvas, and an object on the canvas has a transparency property, then the color value Cs and the alpha value As1 are piled up as Anew and Cnew on the canvas. This means that the piled-up value acts as a source alpha value when the canvas is drawn on a lower layer such as Page.

Figure 2B:
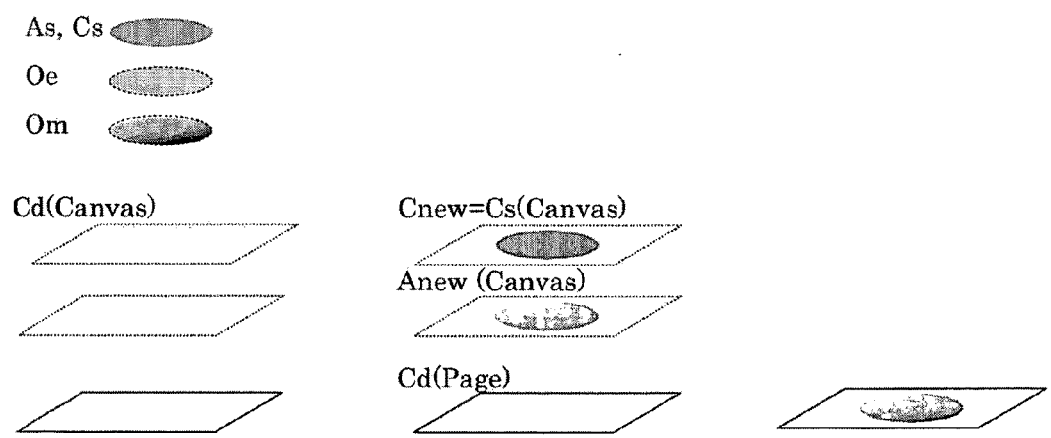

However, if the canvas itself does not have a degree of transparency, then a result of drawing the processed canvas on a page is the same as that of directly drawing the object on the page (see FIG. 2B).

In this case, it is not necessary to carry out a drawing process to another buffer than the page as shown in FIG. 2B, and a drawing process may be carried out as well as one to be carried out without a define of the canvas.

[Case C: A Canvas has a Transparency Property]

As mentioned above, a color value and an alpha value are piled up in an area where an object is drawn, but the other area is still transparent of 0.0 completely.

In an implementation method described in XPS specification for drawing a canvas itself having a degree of transparency, after a drawing process of an object to the canvas is finished, values of properties Opacity and OpacityMask of the canvas element are applied (combined) to an alpha value when the canvas is drawn on a lower layer. This means that the piled-up alpha value is multiplied by Oe and Om of the canvas itself in Blend Step #1.

Figure 3A:
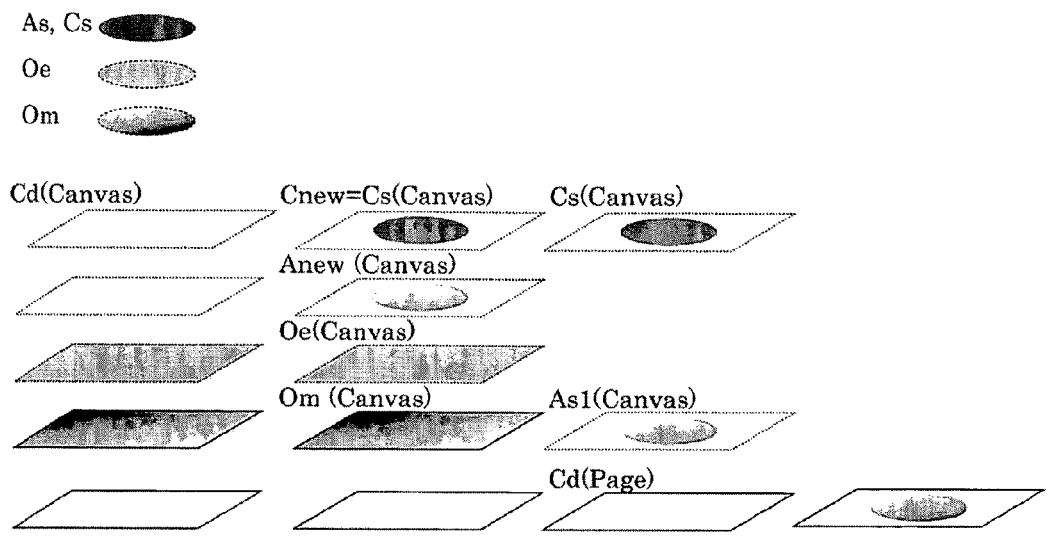
FIGS. 3A and 3B show a schematic diagram of alpha-blend carried out with a drawing process to a canvas (with a transparency setting)

Further, even if Opacity and OpacityMask are applied to an area that any object have not been drawn in a canvas, this area is still transparent, that is, the alpha value is 0.0, and maintained as that any object have not been drawn. Therefore, this transparency process is effective only in a part where an object is drawn (see FIG. 3A).

Figure 3B:
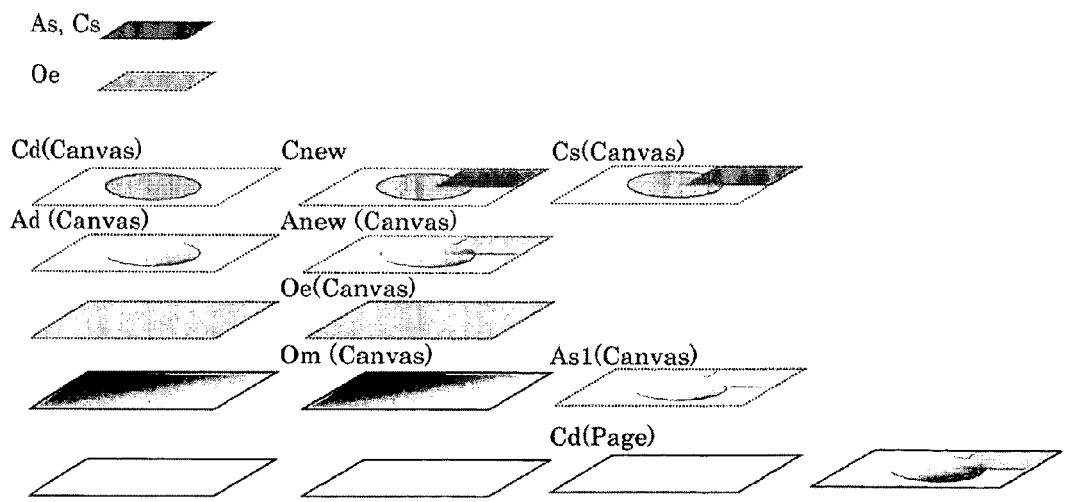

Conceptually, the steps mentioned above are carried out, and when objects engage overlap on a canvas, for example, a strict blend process shown in FIG. 2A has to be carried out with a destination alpha value (see FIG. 3B).

[Configuration]

Figure 4:
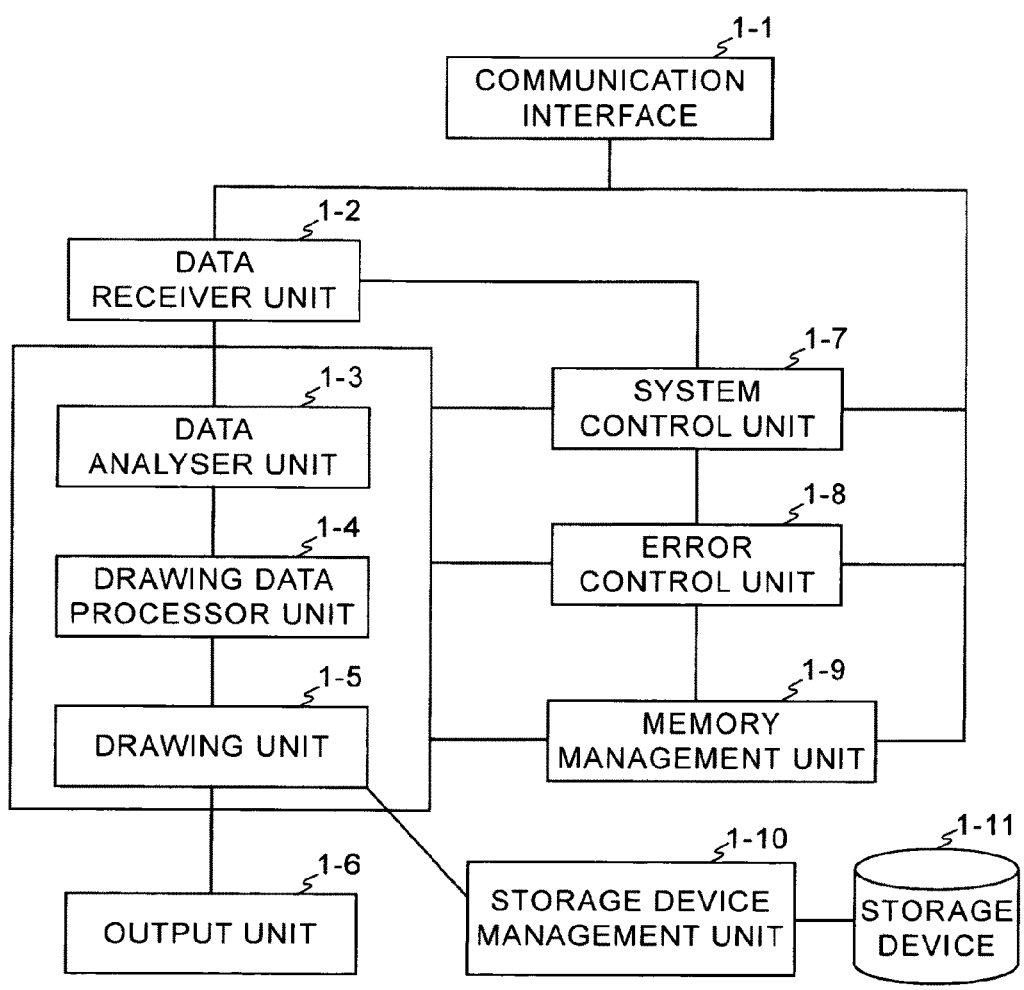
FIG. 4 shows a functional block diagram of an image processing apparatus in Embodiment 1 of this invention.

FIG. 4 shows a functional block diagram of an image processing apparatus in Embodiment 1 of this invention. The image processing apparatus has functional units such as a communication interface 1-1, a data receiver unit 1-2, a data analyser unit 1-3, a drawing data processor unit 1-4 (instance of an intermediate language converter unit), a drawing unit 1-5 (instance of an alpha-blend execution unit), an output unit 1-6, a system control unit 1-7, an error control unit 1-8, a memory management unit 1-9, a storage device management unit 1-10, and a storage device 1-11. In the following part, the functional blocks are explained.

The communication interface 1-1 is a functional unit that communicates with a host computer, or the like.

The data receiver unit 1-2 is a functional unit that receives data (print data described in a page description language) via the communication interface 1-1.

The data analyser unit 1-3 is a functional unit that analyses the print data described in a page description language.

The drawing data processor unit 1-4 converts the print data (i.e. page description language data) to intermediate language data according to instructions from the data analyser unit 1-3. Here, the intermediate language data are a display list, for example.

The page description language data described in a page description language such as XPS as an XML extended format have an element of a drawing object such as path, glyph (font), or image, and also have a canvas as a basis on which the drawing object is displayed. The element and the canvas may have respective transparency properties. Further, the canvas may have a nest structure, and may contain a group that consists of one or more canvases and/or one or more elements in the nest structure.

Figure 5:
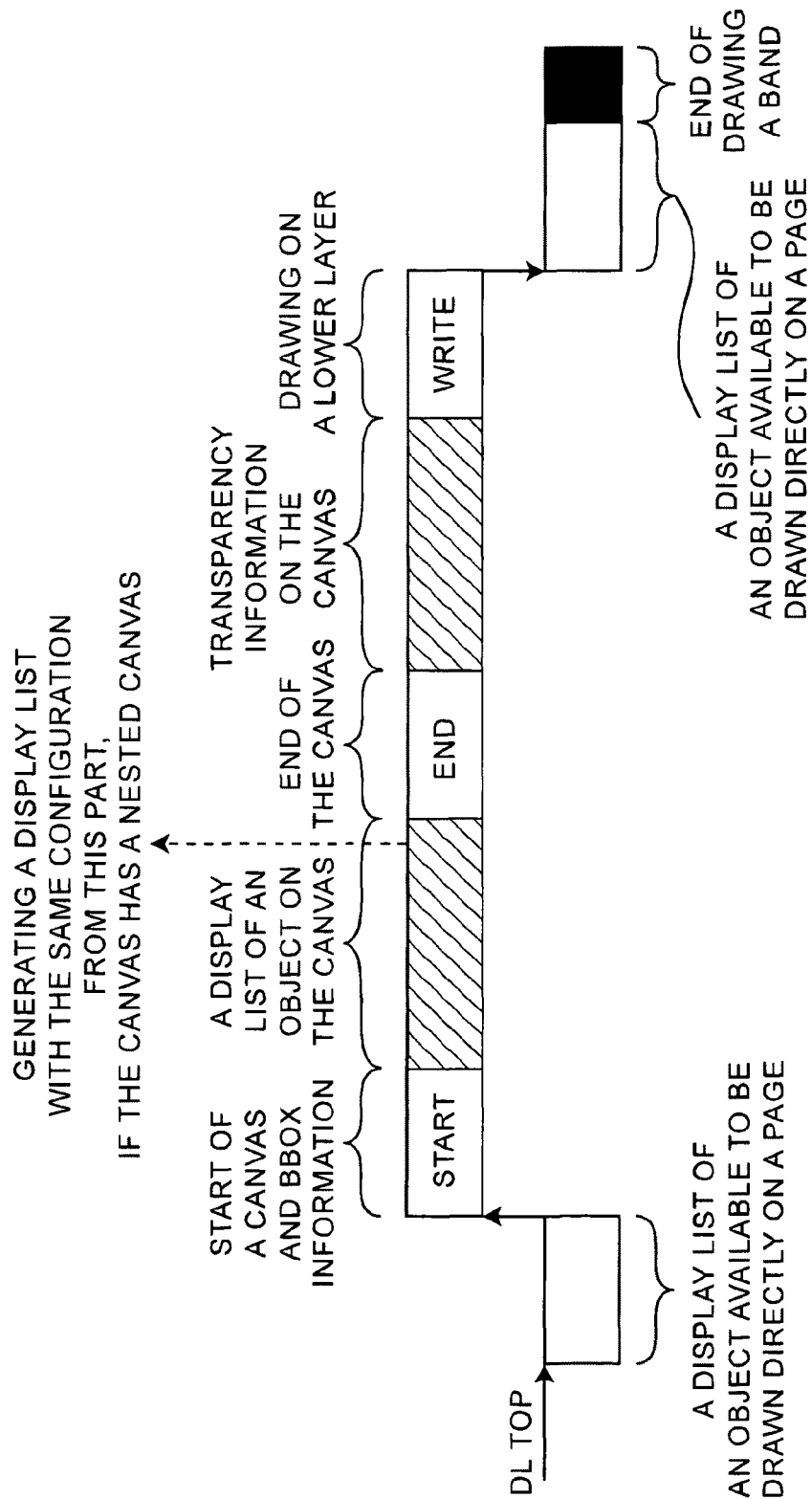
FIG. 5 shows an instance of a data structure of a display list in Embodiment 1 of this invention.

The drawing data processor unit 1-4 converts the canvas data that have a nest structure to intermediate language data with maintaining the nest structure. FIG. 5 shows a data structure of a display list that has been converted from one canvas object.

The canvas object starts at a "Start" mark that indicates the beginning of the canvas, and has a display list of a drawing object or a canvas object on the canvas next to the "Start" mark, and an "End" mark that indicates the end of the canvas, and has a transparency information of the canvas next to the "End" mark, and ends at "Write" command that instructs a drawing process of the canvas to a lower layer.

If the canvas has a nest structure, then a pointer to a nested canvas object is inserted between the "Start" mark and the "End" mark.

The drawing unit 1-5 is a functional unit that generates bitmap data on a VRAM (i.e. drawing memory) from the display list (i.e. intermediate language data) generated by the drawing data processor unit 1-4. The alpha-blend execution is carried out in this drawing unit 1-5.

The data analyser unit 1-3, the drawing data processor unit 1-4, and the drawing unit 1-5 are embodied by executing an image processing program with a computer. This image processing program has been stored in a recording medium in the image processing apparatus. Further, the image processing program may have been stored in a portable recording medium, and may be install from the portable recording medium to this image processing apparatus.

The output unit 1-6 is a functional unit that outputs the bitmap data generated by the aforementioned functional units. Here, outputting may be printing on a medium such as paper sheet or displaying on a display device.

The system control unit 1-7 is a functional unit that manages common information on system components in the image processing apparatus, and controls the system components.

The error control unit 1-8 is a functional unit that controls a process carried out when an error occurs in the image processing apparatus.

The memory management unit 1-9 is a functional unit that manages a memory (i.e. a main memory, that is, a primary memory device) in the image processing apparatus.

The storage device management unit 1-10 controls read and write operations for a secondary memory device such as hard disc drive (i.e. auxiliary memory). In a case that canvases having transparency properties in layers engage overlap, data of a canvas in only a layer necessary for an alpha-blend execution are kept in the main memory, and data of a currently unnecessary canvas are evacuated to the hard disc drive as the auxiliary memory, and the data are read back from the hard disc drive to the main memory when the data is required for an alpha-blend execution between this canvas and another canvas.

The storage device 1-11 is a secondary memory device such as hard disc drive (i.e. auxiliary memory).

[Algorithm of Alpha-Blend Execution]

An alpha-blend execution of a display list (intermediate language data) having a nest structure is efficiently carried out by a recursive algorithm as mentioned below.

A transparency computation "Composite" for a canvas is considered as follows.

In this computation, i of the expression ***_i means current iteration number, and n means the number of objects contained in the canvas.

[Algorithm Presented in Pseudo-Code]

```
C = Composite (C_0, O_0)
Input
    C_0: current color of a destination on which a canvas
is drawn
    O_0: all objects with the canvas
Output
    C: color value of the canvas
    {
        S_0 = C_0 (Expression 1)
```

The following process is carried out iteratively for all objects (with changing i from 1 to n).

```
    {
        if Obj_i is the canvas, call recursively {
            C_i = Composite(SC_(i-1), Obj_i) (Expression 2)
        } else {
            C_i = Obj_i_Color (Expression 3)
        }
        S_i = (1-Obj_i_Alpha) * SC_(i-1) + Obj_i_Alpha *
C_i (Expression 4)
    }
    C = S_i
}
```

Thus, an area to make a copy of a current color is generated as the beginning of the canvas (Expression 1), and a blend process between the canvas and a groundwork with an alpha value of the canvas itself is carried out at the end of the canvas (Expression 4). At the beginning of the page, the initial value S_0 should be white.

[Specific Instance of this Process]

A specific instance of this process in the aforementioned recursive algorithm is explained with FIGS. 6A to 6C and 7A to 7C.

This algorithm allocates a buffer to keep a color temporarily at the beginning of a canvas, and carries out a drawing process with using the buffer. Further, this algorithm considers data in the buffer to be an image at the end of the canvas, and carries out a drawing process of this image to a lower layer with a blend process. If a nested canvas is found while a drawing process of a canvas is carried out, then using a recursive call, this algorithm allocates a buffer to keep a color for the nested canvas, and processes the nested canvas as an upper canvas of the canvas.

An instance of this process will be explained next. In this instance, translucent canvases are in a nest structure, and translucent objects engage overlap on the translucent canvases.

In FIG. 6A, Canvas1 has Opacity=0.5 in the first nest level described in XPS, and Object1 is a rectangle drawing object on Canvas1, and Canvas2 is a nested canvas that has Opacity=0.5 in the second nest level, and Object2 and Object3 are triangle drawing objects on Canvas2.

FIG. 6B shows a drawn image under assumption that all of the objects in the XPS data shown in FIG. 6A does not have any transparency properties (i.e. Opacity properties), and FIG. 6C shows a drawn image as a result of an alpha-blend execution of transparency properties (i.e. Opacity properties) carried out according to the XPS data shown in FIG. 6A. It should be noted that FIGS. 6A and 6B are not color for explanation, and therefore, FIGS. 6A and 6B show the images converted to grayscale.

[Instance of Evacuating a Layer]

Figure 7A:
FIGS. 7A to 7C show diagrams for explaining a process for canvases having three layers.
Figure 7B:
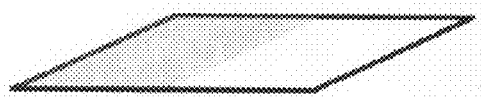
Figure 7C:

FIGS. 7A to 7C show an instance of three piled-up layers of canvases. FIG. 7A shows a canvas and a triangle drawing object on the canvas, and this canvas has a transparency property; FIG. 7B shows a canvas in a lower layer than the canvas shown in FIG. 7A, and this canvas also has a transparency property; and FIG. 7C shows a canvas in a lower layer than the canvas shown in FIG. 7B. A page on which drawing process of a final memory-image is carried out may be used instead of the canvas shown in FIG. 7C.

In this case, a drawing process is carried out from a lowest layer, and therefore, a memory area is allocated in the main memory to write a memory-image of the canvas shown in FIG. 7C or the page, and the memory-image is written in the memory area, and then the memory-image is evacuated to the storage device, 1-11. In the same way, a memory area is allocated in the main memory to write a memory-image of the canvas shown in FIG. 7B, and the memory-image is written in the memory area, and then the memory-image is evacuated to the storage device 1-11.

Thereafter, a memory area is allocated in the main memory to write a memory-image of the canvas in the top layer shown in FIG. 7A, and then a drawing process and an alpha-blend execution of the triangle drawing object are carried out.

After the drawing process and the alpha-blend execution of the top layer is finished, the memory-image of the canvas shown in FIG. 7B is read back from the storage device 1-11 to the main memory, and an alpha-blend execution is carried out between this layer and the top layer; and then the memory-image of the canvas shown in FIG. 7C or the page is read back from the storage device 1-11 to the main memory, and an alpha-blend execution is carried out between this layer and the upper layer that the alpha-blend execution was just done.

[Flowchart]

Figure 8:
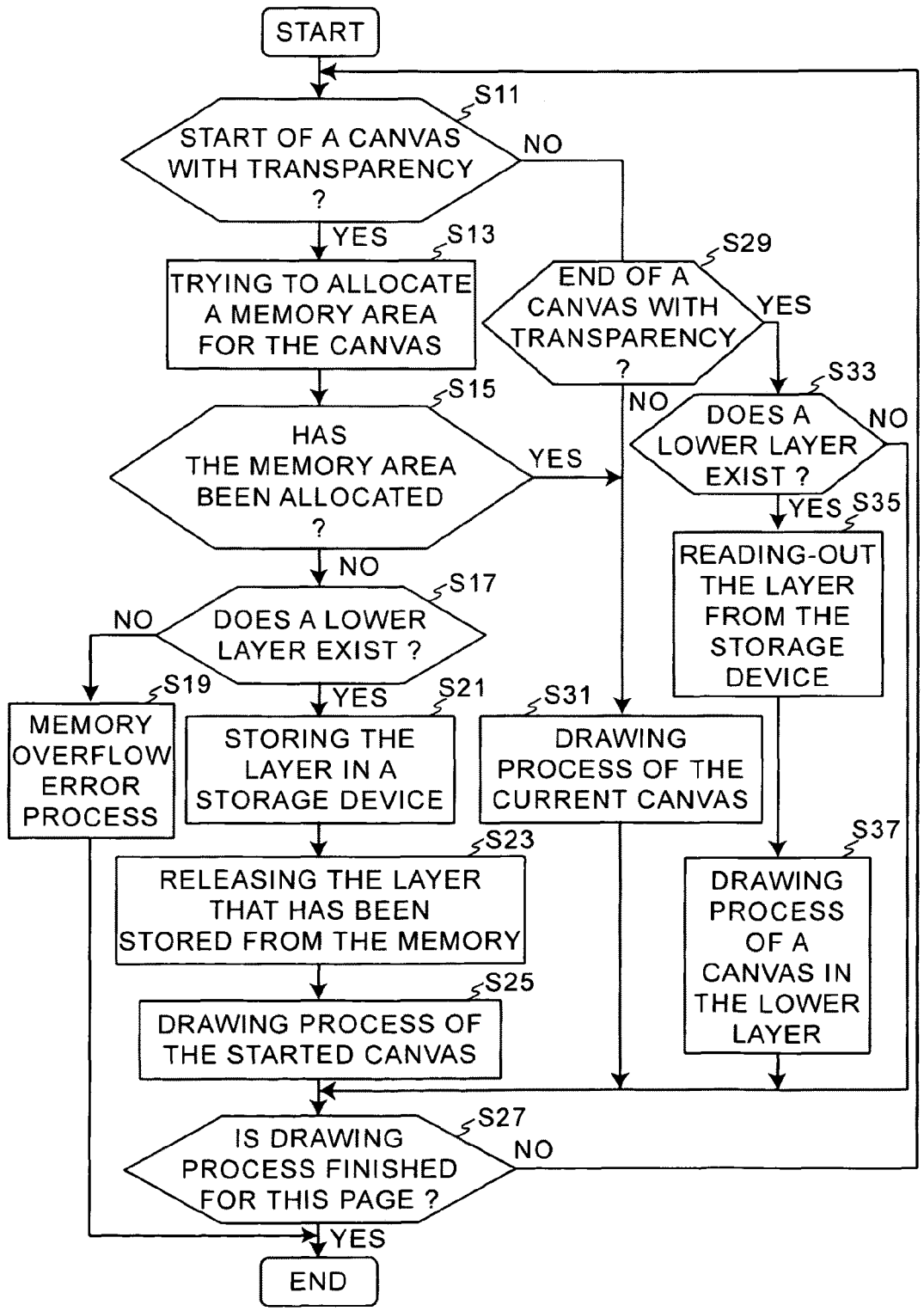
FIG. 8 shows a flowchart that indicates operation of the image processing apparatus in Embodiment 1 of this invention.

FIG. 8 shows a flowchart that indicates operation of the image processing apparatus in Embodiment 1 of this invention.

The image processing apparatus starts analysing print data according to the flowchart in FIG. 8 upon receiving the print data.

Step S11:

The drawing unit 1-5 determines whether or not the beginning of a canvas having a transparency property exists. If the beginning of a canvas having a transparency property exists, then Step S13 is next executed. If the beginning of a canvas having a transparency property does not exist, then Step S29 is next executed.

Step S13:

The memory management unit 1-9 tries to allocate a memory area with a size required for the canvas. The memory area is allocated in the memory, and used as a buffer.

Step S15:

After Step S13, the memory management unit 1-9 determines whether or not the memory area has been allocated successfully. If the memory area has been allocated successfully, then Step S31 is next executed. If the memory area has not been allocated successfully, then Step S17 is next executed.

Step S17:

The drawing unit 1-5 determines whether or not a lower layer exists than the layer currently processed. If a lower layer exists than the layer currently processed, then Step S21 is next executed. If any lower layers do not exist than the layer currently processed, then Step S19 is next executed.

Step S19:

Since the buffer was not allocated and any lower layers do not exist than this layer, the drawing unit 1-5 ends this process after a memory overflow process.

Step S21:

The storage device management unit 1-10 stores the lower layer (i.e. the memory-image of the canvas in the lower layer) in the storage device 1-11.

Step S23:

The memory management unit 1-9 releases the memory area for the lower layer stored in the storage device 1-11.

Step S25:

The drawing unit 1-5 carries out a drawing process of the current canvas.

Step S27:

The drawing unit 1-5 determines whether or not all drawing processes for a page are finished. If all drawing processes for a page are finished, then this process ends. If all drawing processes for a page are not finished, then Step S11 is next executed, and the aforementioned process is carried out again for next data.

Step S29:

The drawing unit 1-5 determines whether or not the canvas having a transparency property ends.

Step S31:

The drawing unit 1-5 The drawing unit 1-5 carries out a drawing process of the current layer.

Step S33:

The drawing unit 1-5 determines whether or not a lower layer exists than the layer currently processed. If a lower layer exists than the layer currently processed, then Step S35 is next executed. If any lower layers do not exist than the layer currently processed, then Step S27 is next executed.

Step S35:

The storage device management unit 1-10 reads out the lower layer (i.e. the memory image) from the storage device.

Step S37:

The drawing unit 1-5 carries out a drawing process of the canvas to the lower layer.

Advantages of Embodiment 1

In Embodiment 1, when the apparatus composes transparency properties of drawing objects and canvases in a nest structure described in a page description language such as an XML extended format (e.g. XPS), that is, when the apparatus carries out an alpha-blend execution, the apparatus evacuates images of canvases in piled-up layers from the main memory to the auxiliary memory at once, and reads back an image from the auxiliary memory to the main memory when the image is required for the alpha-blend execution. Therefore, it is avoided that the main memory is full of image data of the canvases and the process stops due to memory overflow.

Embodiment 2

In the following part, an image processing apparatus according to Embodiment 2 of this invention will be explained.

[Configuration]

Figure 9:
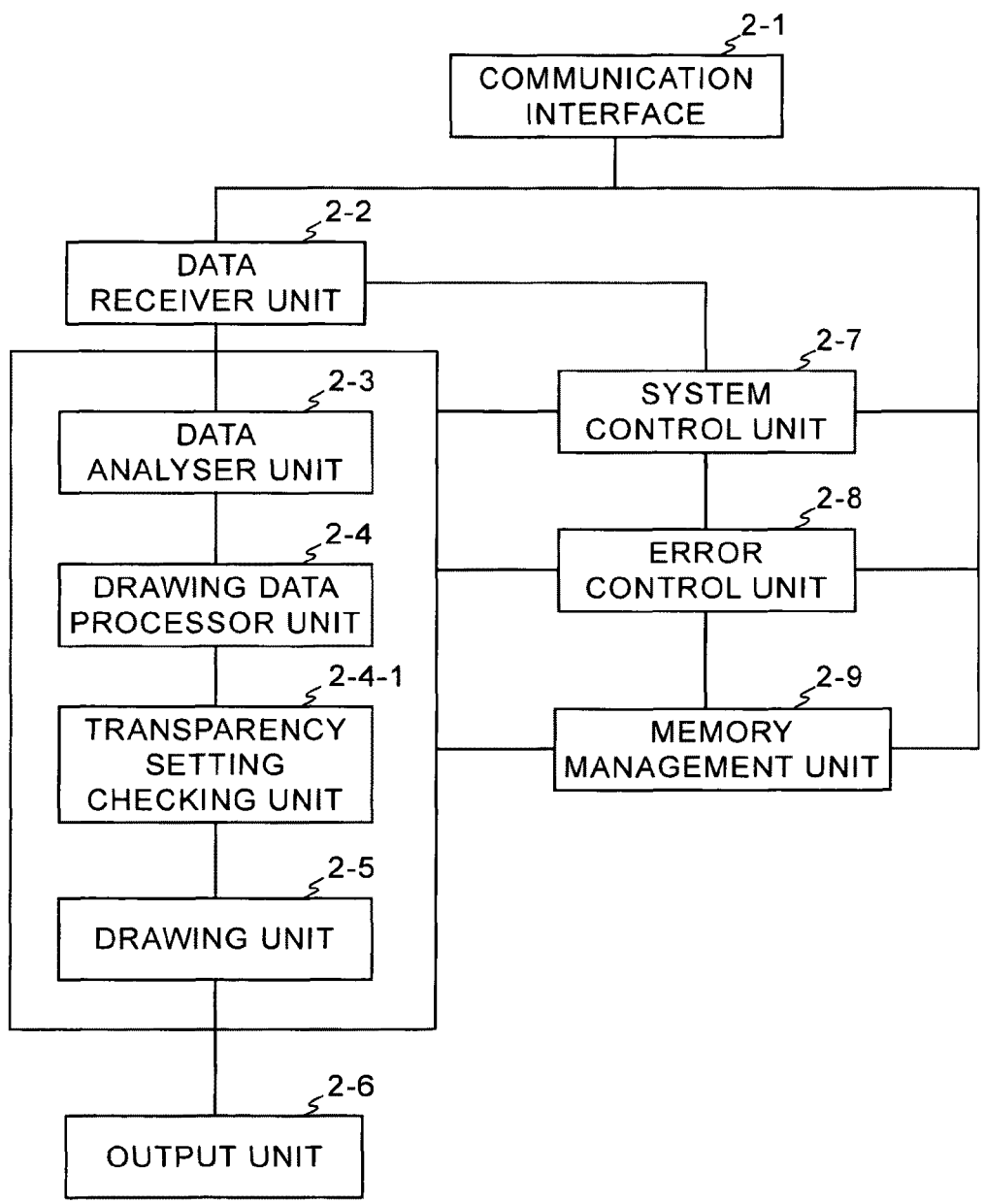
FIG. 9 shows a functional block diagram of an image processing apparatus in Embodiment 2 of this invention.

FIG. 9 shows a functional block diagram of an image processing apparatus in Embodiment 2 of this invention. The image processing apparatus has functional units such as a communication interface 2-1, a data receiver unit 2-2, a data analyser unit 2-3, a drawing data processor unit 2-4 (instance of an intermediate language converter unit), a transparency setting checking unit 2-4-1, a drawing unit 2-5 (instance of an alpha-blend execution unit), an output unit 2-6, a system control unit 2-7, an error control unit 2-8, and a memory management unit 2-9. In the following part, the functional blocks are explained.

The communication interface 2-1 is a functional unit that communicates with a host computer, or the like.

The data receiver unit 2-2 is a functional unit that receives data (print data described in a page description language) via the communication interface 2-1.

The data analyser unit 2-3 is a functional unit that analyses the print data described in a page description language.

The drawing data processor unit 2-4 converts the print data (i.e. page description language data) to intermediate language data according to instructions from the data analyser unit 2-3. Here, the intermediate language data is a display list, for example.

The page description language data described in a page description language such as XPS as an XML extended format have an element of a drawing object such as path, glyph (font), or image, and also have a canvas as a basis on which the drawing object is displayed. The element and the canvas may have respective transparency properties. Further, the canvas may have a nest structure, and may contain a group that consists of one or more canvases and/or one or more elements in the nest structure.

The drawing data processor unit 2-4 converts the canvas data that have a nest structure to intermediate language data with maintaining the nest structure. FIG. 5 shows a data structure of a display list that has been converted from one canvas object.

The canvas object starts at a "Start" mark that indicates the beginning of the canvas, and has a display list of a drawing object or a canvas object on the canvas next to the "Start" mark, and an "End" mark that indicates the end of the canvas, and has a transparency information of the canvas next to the "End" mark, and ends at "Write" command that instructs a drawing process of the canvas to a lower layer.

If the canvas has a nest structure, then a pointer to a nested canvas object is inserted between the "Start" mark and the "End" mark.

The transparency setting checking unit 2-4-1 memorises a transparency setting in drawing data input to the drawing data processor unit 2-4 if the drawing data have the transparency setting. The transparency setting is memorised in association with a page. The transparency setting includes a degree of transparency of a canvas, a degree of transparency of a drawing object's color, OpacityMask, etc. Upon receiving an inquiry from the drawing data processor unit 2-4, the transparency setting checking unit 2-4-1 returns information on whether or not the transparency setting is in the drawing data input at the time of the inquiry.

The drawing unit 2-5 is a functional unit that generates bitmap data on a VRAM from the display list (i.e. intermediate language data) generated by the drawing data processor unit 2-4. The alpha-blend execution is carried out in this drawing unit 2-5.

The data analyser unit 2-3, the drawing data processor unit 2-4, and the drawing unit 2-5 are embodied by executing an image processing program with a computer. This image processing program has been stored in a recording medium in the image processing apparatus. Further, the image processing program may have been stored in a portable recording medium, and may be install from the portable recording medium to this image processing apparatus.

The output unit 2-6 is a functional unit that outputs the bitmap data generated by the aforementioned functional units. Here, outputting may be printing on a medium such as paper or displaying on a display device.

The system control unit 2-7 is a functional unit that manages common information on system components in the image processing apparatus, and controls the system components.

The error control unit 2-8 is a functional unit that controls a process carried out when an error occurs in the image processing apparatus.

The memory management unit 2-9 is a functional unit that manages a memory in the image processing apparatus.

FIGS. 10A to 10E show a sequence of a drawing process by the drawing unit 2-5 corresponding to the data shown in FIG. 6A, and the sequence is explained with the expressions of the aforementioned recursive algorithm.

Figure 10A:
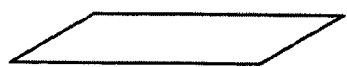
FIGS. 10A to 10E show a sequence of a drawing process corresponding to XPS data described in FIG. 6A.

[Allocation of a Page Buffer] See FIG. 10*a*.

Firstly, a page buffer is allocated for a page.

Figure 10B:
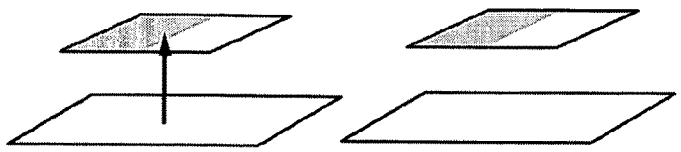

[The beginning of Canvas1] See FIG. 10B.

A current result of drawing processes in the page buffer is copied to Canvas1 (Expression 1). Then, Object1 is drawn on Canvas1 (Expressions 3 and 4). Transparency information of Canvas1 is maintained, for example, as a local variable in the recursive call routine.

Figure 10C:
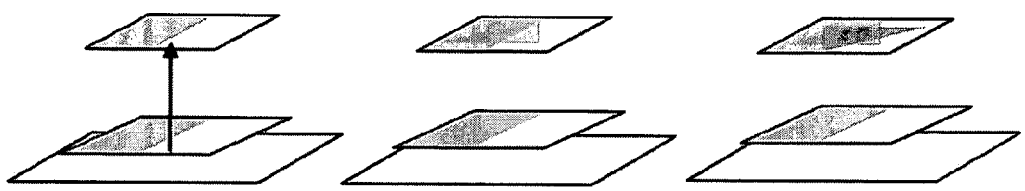

[The beginning of Canvas2] See FIG. 10C.

A current result that has been drawn on Canvas1 is copied to Canvas2 (the recursive call by Expression 2, and Expression 1).

Then, objects (Object2, Object3) are drawn on Canvas2. When the objects are drawn, an alpha-blend execution is carried out on Canvas2 (Expressions 3 and 4).

Transparency information of Canvas2 is maintained, for example, as a local variable of the recursive call routine, as well as the transparency information of Canvas'.

Figure 10D:
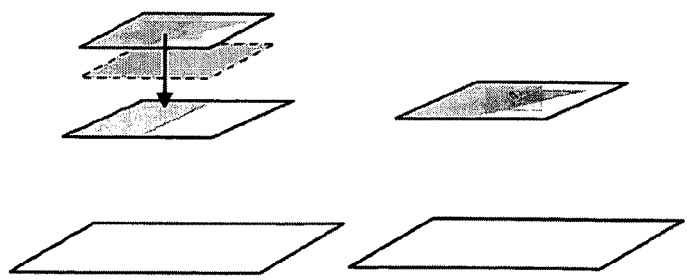

[The end of Canvas1] See FIG. 10D.

Canvas2 as an image is drawn on Canvas1 in a lower layer with the transparency information (Opacity value and OpacityMask value in the element) of Canvas2 itself (Expression 4).

A buffer of Canvas2 is released.

Figure 10E:
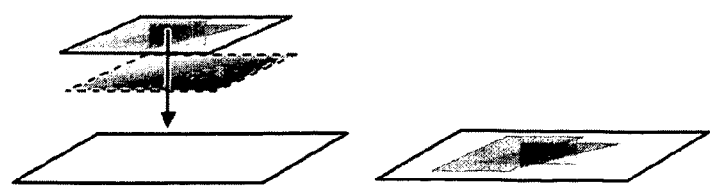

[The End of Canvas1] See FIG. 10*e*.

Canvas1 as an image is drawn on the page with the transparency information (Opacity value and OpacityMask value in the element) of Canvas1 itself (Expression 4).

A buffer of Canvas1 is released.

According to a series of the aforementioned operations, alpha-blend executions are carried out in the recursive algorithm.

[Flowchart]

Figure 11:
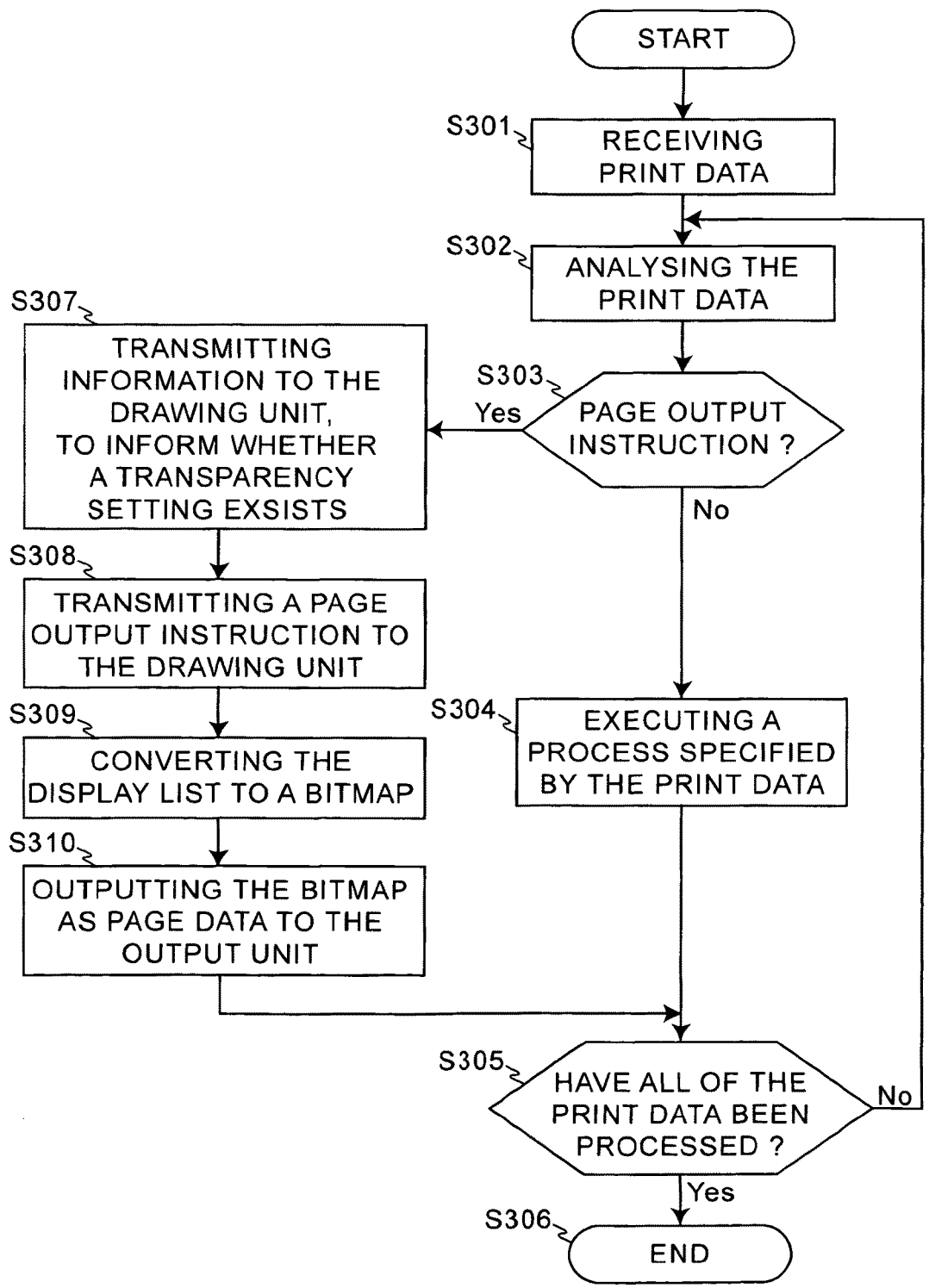
FIG. 11 shows a flowchart that indicates operation of the image processing apparatus in Embodiment 2 of this invention.

FIG. 11 shows a flowchart that indicates operation of the image processing apparatus in Embodiment 2 of this invention.

Step S301:

The data receiver unit 2-2 receives print data via the communication interface 2-1 from a PC, or the like.

Step S302:

The data analyser unit 2-3 analyses the print data received by the data receiver unit 2-2. The data analyser unit 2-3 causes the drawing data processor unit 2-4 to carry out a drawing process.

Step S303:

It is determined whether or not an instruction in the print data analysed by the data analyser unit 2-3 is a page output instruction.

Step S304:

If an instruction in the print data analysed by the data analyser unit 2-3 is not a page output instruction, then the drawing data processor unit 2-4 carries out a process specified by the instruction. The drawing data processor unit 2-4 generates a display list (i.e. drawing instructions in an intermediate language) based on information supplied from the data analyser unit 2-3. If the instruction is an instruction of a transparency setting, then the drawing data processor unit 2-4 provides content of the instruction to the transparency setting checking unit 2-4-1. The transparency setting checking unit 2-4-1 determines whether or not a canvas is opaque according to a value of a degree of transparency of the canvas, and sets the result of whether a canvas is opaque to a flag.

Step S305:

The data analyser unit 2-3 determines whether or not all of the data received by the data receiver unit 2-2 have been processed. If any of the data has not been processed, then return to Step S302, and the data are continuously analysed.

Step S306:

If all of the data have been processed, then the process ends after a process in which a memory area used in the drawing processes is released and a print engine is notified of the end of all drawing processes.

Step S307:

The drawing data processor unit 2-4 inquires of the transparency setting checking unit 2-4-1 whether or not a page currently processed has a drawing object of which a degree of transparency indicates translucent. The drawing data processor unit 2-4 notifies the drawing unit 2-5 of whether the page has a drawing object of which a degree of transparency indicates translucent.

Step S308:

The drawing data processor unit 2-4 transmits a page output instruction to the drawing unit 2-5.

Step S309:

The drawing unit 2-5 optimally generates bitmap data from the display list according to information obtained in Steps S307 and S308. The drawing unit 2-5 checks a value of the flag set by the transparency setting checking unit 2-4-1, and allocates a memory area for an alpha-blend execution if at least a canvas is not opaque, and then carries out the alpha-blend execution. If all canvases are opaque, then an alpha-blend execution is not necessary, and therefore the drawing unit 2-5 directly writes bitmap data in the VRAM (i.e. page memory).

Step S310:

The drawing unit 2-5 transmits the bitmap data of one page to the output unit 2-6, and the output unit 2-6 carries out printing.

Advantages of Embodiment 2

In Embodiment 2, when the apparatus composes transparency properties of drawing objects and canvases in a nest structure described in a page description language such as an XML extended format (e.g. XPS), that is, the apparatus carries out an alpha-blend execution, to efficiently carry out an alpha-blend execution, the apparatus converts page description language data having the nest structure to intermediate language data with maintaining the nest structure. By the recursive algorithm, the apparatus can carry out alpha-bend executions of intermediate language data that have a nest structure.

By the aforementioned method, alpha-blend executions are efficiently carried out over nest levels.

By this embodiment, alpha-blend executions are carried out with intermediate language data that have a nest structure, and then the intermediate language data are converted to bitmap data, and a printer performs printing with the bitmap data.

By this embodiment, the image processing apparatus analyses transparency settings in print data, and generates bitmap data from a display list (i.e. intermediate language data) based on the analysing result. Therefore, drawing processes are carried out at high speed due to high memory efficiency in specific cases, for example, a case that print data do not have transparency settings.

Embodiment 3

Figure 12:
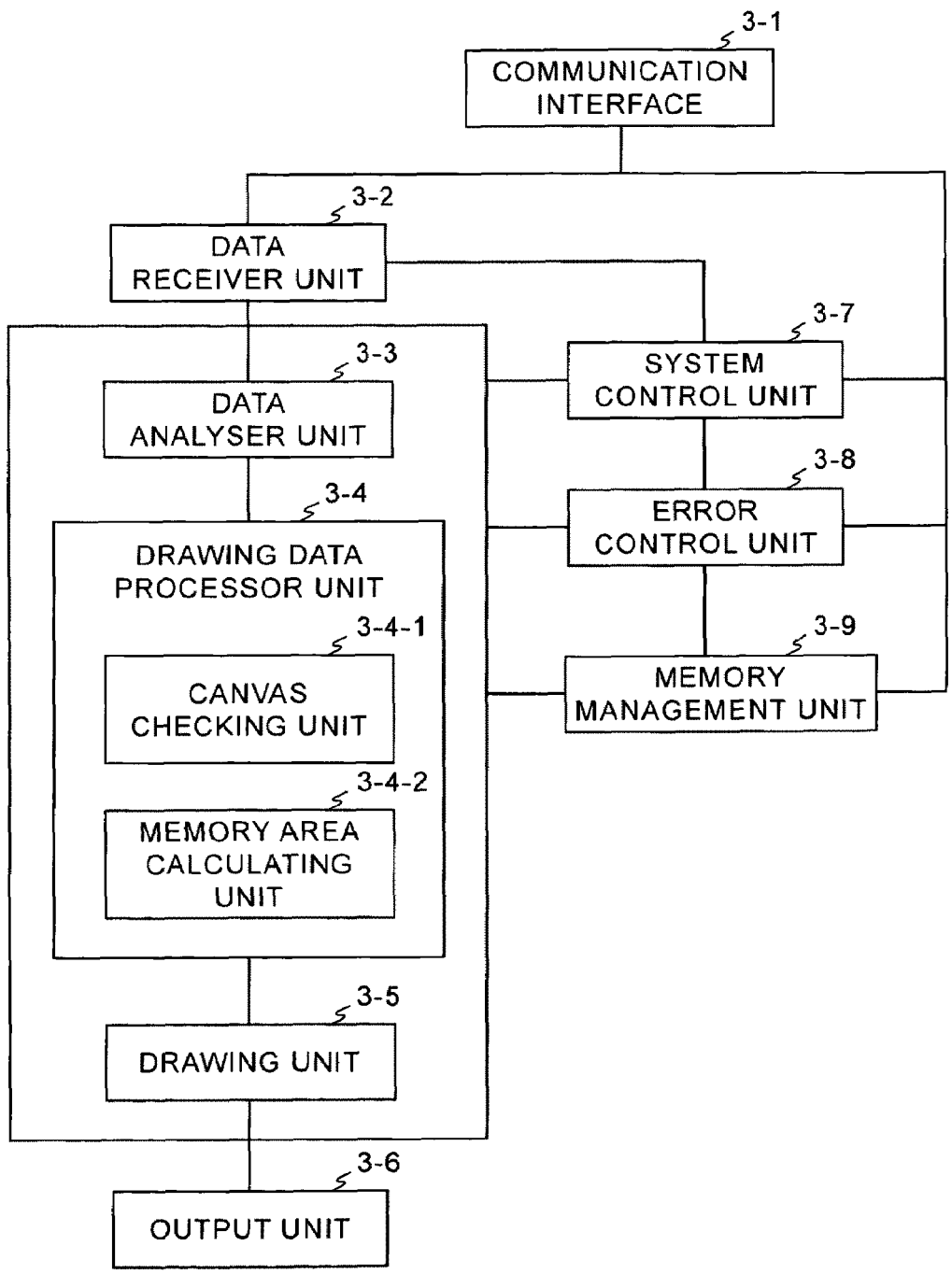
FIG. 12 shows a functional block diagram of an image processing apparatus in Embodiment 3 of this invention.

In the following part, an image processing apparatus according to Embodiment 3 of this invention will be explained.
[Configuration]
FIG. 12 shows a functional block diagram of an image processing apparatus in Embodiment 3 of this invention. The image processing apparatus has functional units such as a communication interface 3-1, a data receiver unit 3-2, a data analyser unit 3-3, a drawing data processor unit 3-4 (instance of an intermediate language converter unit and a drawing data converter unit), a canvas checking unit 3-4-1, a memory area calculating unit 3-4-2, a drawing unit 3-5 (instance of an alpha-blend execution unit and a drawing data converter unit), an output unit 3-6, a system control unit 3-7, an error control unit 3-8, and a memory management unit 3-9. In the following part, the functional blocks are explained.

The communication interface 3-1 is a functional unit that communicates with a host computer, or the like.

The data receiver unit 3-2 is a functional unit that receives data (print data described in a page description language) via the communication interface 3-1.

The data analyser unit 3-3 is a functional unit that analyses the print data described in a page description language.

The drawing data processor unit 3-4 converts the print data (i.e. page description language data) to intermediate language data according to instructions from the data analyser unit 3-3. Here, the intermediate language data is a display list, for example.

The page description language data described in a page description language such as XPS as an XML extended format have an element of a drawing object such as path, glyph (font), or image, and also have a canvas as a basis on which the drawing object is displayed. The element and the canvas may have respective transparency properties. Further, the canvas may have a nest structure, and may contain a group that consists of one or more canvases and/or one or more elements in the nest structure.

Further, the drawing data processor unit 3-4 is a part of a drawing data converter unit that converts a page description language data to a drawing data. The drawing data processor unit 3-4 converts a page description language data to intermediate language data (i.e. a display list). The drawing data processor unit 3-4 converts the canvas data that have a nest structure to intermediate language data with maintaining the nest structure. FIG. 5 shows a data structure of a display list that has been converted from one canvas object.

The canvas object starts at a "Start" mark that indicates the beginning of the canvas, and has a display list of a drawing object or a canvas object on the canvas next to the "Start" mark, and an "End" mark that indicates the end of the canvas, and has a transparency information of the canvas next to the "End" mark, and ends at "Write" command that instructs a drawing process of the canvas to a lower layer.

If the canvas has a nest structure, then a pointer to a nested canvas object is inserted between the "Start" mark and the "End" mark.

The canvas checking unit 3-4-1 identifies a canvas that does not have any drawing objects thereon and a transparency property thereof indicates opaque. Detailed operation of the canvas checking unit 3-4-1 will be explained in explanation of the flowchart mentioned below.

The memory area calculating unit 3-4-2 calculates a size of a memory area for a canvas. Detailed operation of the memory area calculating unit 3-4-2 will be explained in explanation of the flowchart mentioned below.

The drawing unit 3-5 is a functional unit that generates bitmap data on a VRAM (i.e. drawing memory) from the display list (i.e. intermediate language data) generated by the drawing data processor unit 3-4. The alpha-blend execution is carried out in this drawing unit 3-5 when a display list is converted to bitmap data.

The data analyser unit 3-3, the drawing data processor unit 3-4, and the drawing unit 3-5 are embodied by executing an image processing program with a computer. This image processing program has been stored in a recording medium in the image processing apparatus. Further, the image processing program may have been stored in a portable recording medium, and may be install from the portable recording medium to this image processing apparatus.

The output unit 3-6 is a functional unit that outputs the bitmap data generated by the aforementioned functional units. Here, outputting may be printing on a medium such as paper or displaying on a display device.

The system control unit 3-7 is a functional unit that manages common information on system components in the image processing apparatus, and controls the system components.

The error control unit 3-8 is a functional unit that controls a process carried out when an error occurs in the image processing apparatus.

The memory management unit 3-9 is a functional unit that manages a memory in the image processing apparatus.
[Flowchart of Memory Usage and Operation when Processing a Canvas]

In the following part, are explained memory usage operation of the image processing apparatus when processing a canvas, and a flowchart of operation from receiving print data to outputting bitmap data.

When a printer carries out a blend process in a drawing process, 8 bits are required for each element of (R, G, B, alpha), and therefore, color information of 32 bits is required for one pixel. As mentioned above, if a canvas having a transparency property is used, a memory area is required to maintain a drawing result of a drawing process on the canvas. In general, in a drawing process by a printer, a page is divided into bands with taking memory usage into account, and a figure is drawn band by band. Therefore, a memory area for a band is sufficient for the memory area required to maintain a drawing result. In case of an image for A4 size of a paper sheet, if the height of a band is 200 lines, then a memory area of about 3.8 Mbytes is required for this band.

A canvas is processed in the drawing unit 3-5. Since the drawing unit 3-5 requires high speed processing, it is sometimes implemented as a specific hardware. If the drawing unit 3-5 is implemented as software (i.e. a computer with a program), the drawing unit 3-5 has to run at high speed, for example, by reducing conditional branches. Therefore, a memory area required by the drawing unit 3-5 is allocated in advance.

If a canvas does not have a transparency property, but a nested canvas of the canvas has a transparency property, then in a blend process, 32-bit color information must also be used for processing the canvas that does not have a transparency property. Further, if canvases are in a nest structure, then a memory area having a size corresponding to the number of nest levels is required to maintain drawing results of the canvases.

If pluralities of canvases are used, then a blend process between two canvases must be carried out. A blend process between two canvases must also be a strict blend process. In image processing in a page printer, after a drawing object is converted to specific intermediate language, bitmap data are generated from the intermediate language data. By this, for high speed processing, it is possible to carry out generating the intermediate language data and generating the bitmap data in parallel. If pluralities of canvases are used, then a memory area is allocated in advance for canvases used at the same time, and when generating intermediate language data to bitmap data, bitmap data of an object drawn on each of the canvases are generated from the intermediate language data, and a blend process between canvases is carried out if necessary.

In such drawing system, even if a transparency property of a canvas indicates opaque and anything is not drawn on the canvas, a memory area for this canvas is also allocated in advance. Even in a system that does not allocate a memory area for a canvas in advance, a memory area for such canvas is also allocated at the time when such canvas is detected when intermediate language data is converted to bitmap data.

However, since a drawing process can be carried out without the canvas of which a transparency property indicates opaque and on which anything is not drawn, a memory area for such canvas is not necessary.

Therefore, in advance it is determined whether or not such canvas exists, and a memory area for such canvas is not allocated. Simple instances of such canvas in XPS are presented below.

[Expression of an Empty Canvas in XPS]—XPS001

```
<Canvas>
</Canvas>
```

A next expression in XPS is an empty canvas in a nest structure.

[Expression of an Empty Canvas in a Nest Structure in XPS]—XPS002

```
<Canvas>
  <Canvas>
    a drawing object
  </Canvas>
</Canvas>
```

The first canvas is called as Canvas1, and a nested canvas inside of Canvas1 is called as Canvas2. A drawing object is drawn on Canvas2. Canvas1 contains Canvas2, but anything is not drawn on Canvas1 itself.

If this expression is processed sequentially, since a drawing result of Canvas2 is copied onto Canvas1. Therefore, if a drawing result of Canvas2 is used instead of a drawing result of Canvas1, then a memory area for Canvas1 is not necessary and not allocated.

Figure 13:
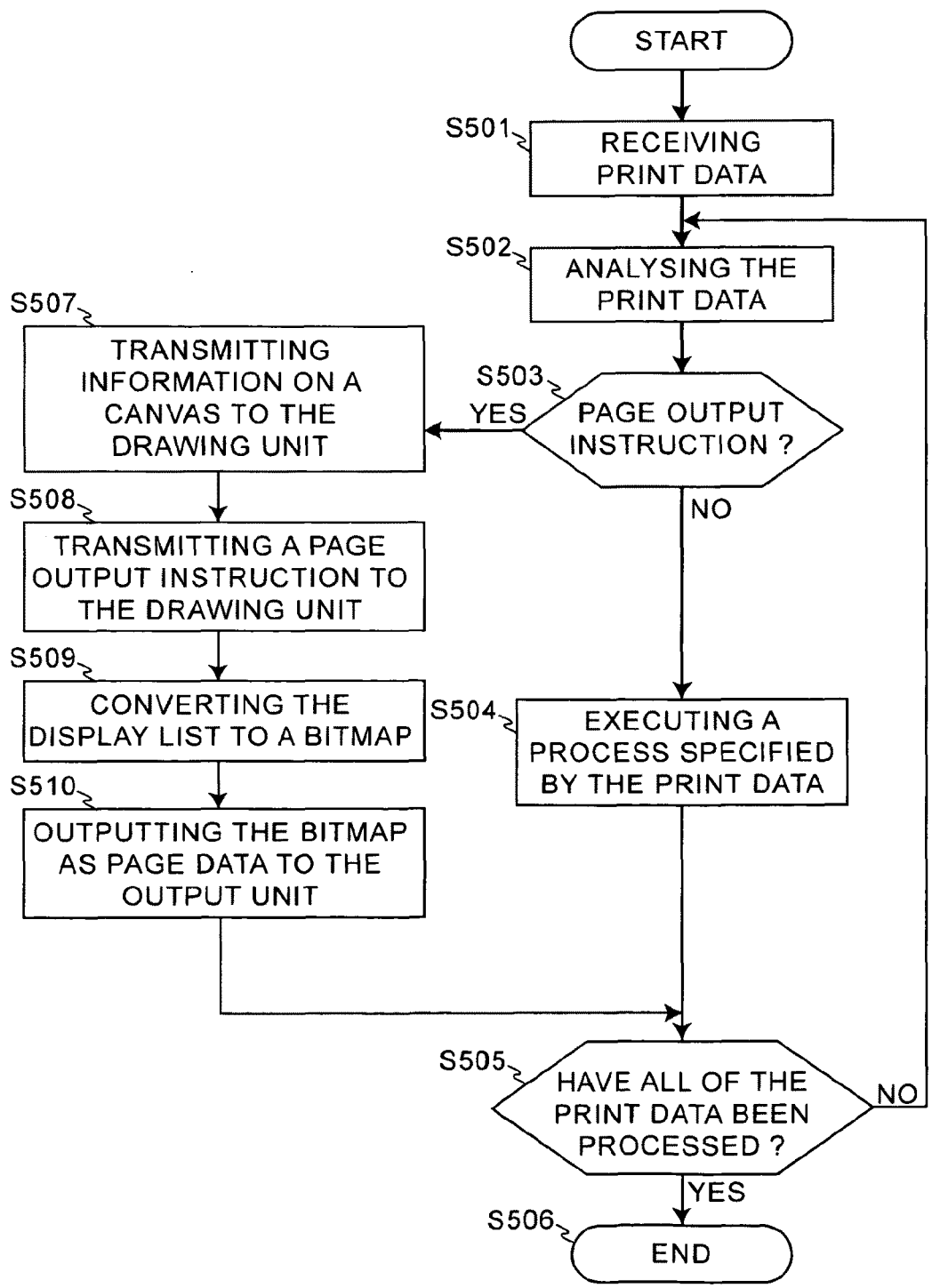
FIG. 13 shows a flowchart that indicates operation of the image processing apparatus in Embodiment 3 of this invention.

FIG. 13 shows a whole drawing process in Embodiment 3. In the following part, a whole drawing process is explained with reference to FIG. 13.

Step S501:
The data receiver unit 3-2 receives print data via the communication interface 3-1 from a host PC, or the like.

Step S502:
The data analyser unit 3-3 analyses the received print data.

Step S503:
According to the analysing result, the data analyser unit 3-3 determines whether or not an instruction in the print data is a page output instruction.

Step S504:
If an instruction in the print data is not a page output instruction, then the drawing data processor unit 3-4 is invoked to carry out a process specified by the instruction.

A process specified by the instruction is one of various kinds of processes. If the instruction is an instruction to handle a canvas, then a next process is carried out.

As shown in FIG. 12, the drawing data processor unit 3-4 contains the canvas checking unit 3-4-1 and the memory area calculating unit 3-4-2. Upon the drawing data processor unit 3-4 receives a request to start processing a canvas from the data analyser unit 3-3, the canvas checking unit 3-4-1 memorises a transparency setting of the canvas. In addition, a flag is prepared to memorise information on whether or not something is drawn on the canvas, and an initial value is set to the flag. The initial value indicates that anything is not drawn on the canvas. These pieces of information are memorised on each canvas. When something is drawn on the canvas, the value of the flag corresponding to the canvas is changed to a value that indicates something is drawn on the canvas.

Upon the drawing data processor unit 3-4 receives a request to end processing the canvas from the data analyser unit 3-3, the memory area calculating unit 3-4-2 refers to the information on the transparency setting of the canvas and the information on whether or not something is drawn on the canvas, and calculates a size of a memory area required to process the canvas with taking the information into account. For a canvas of which a transparency setting indicates opaque and on which anything is not drawn, it is determined that a size of a memory area is zero, and it is memorised as information on the canvas.

Step S505:
The data analyser unit 3-3 inquires of the data receiver unit 3-2, and determines whether or not all of the print data have been processed. If any of the print data has not been processed, then return to Step S502, and the print data are continuously analysed.

Step S506:
If all of the print data have been processed, then the process ends. Here is not considered that processing the print data may end without detecting a page output instruction.

Step S507:
If in Step S503 it is determined that an instruction in the print data is a page output instruction, then Step S507 is executed, and the drawing data processor unit 3-4 is invoked to carry out a page output process. The drawing data processor unit 3-4 transmits information on each canvas to the drawing unit 3-5. The drawing data processor unit 3-4 may allocate a memory area required for processing a canvas and transmit information on the memory area to the drawing unit 3-5. Alternatively, the drawing unit 3-5 may refer the information on a canvas from the drawing data processor unit 3-4, and may allocate a memory area required for processing a canvas.

Step S508:
The drawing data processor unit 3-4 transmits a page output instruction to the drawing unit 3-5.

Step S509:
The drawing unit 3-5 receives a page output instruction, and then generates bitmap data of a page described as intermediate language data (a display list). A drawing process of the canvas is also carried out. When the aforementioned canvases such as XPS002 in a nest structure are processed, the drawing unit 3-5 identifies an empty canvas from memorised information on these canvases, and uses a drawing result of a nested canvas as a drawing result of a canvas outside of the nested canvas.

Step S510:

After generating bitmap data of one page, the drawing unit 3-5 transmits the bitmap data of one page to the output unit 3-6, and the output unit 3-6 carries out printing.

Advantages of Embodiment 3

In Embodiment 3, when the apparatus composes transparency properties of drawing objects and canvases in a nest structure described in a page description language such as an XML extended format (e.g. XPS), that is, the apparatus carries out an alpha-blend execution, to efficiently carry out an alpha-blend execution, the apparatus converts page description language data having the nest structure to intermediate language data with maintaining the nest structure. By the recursive algorithm, the apparatus can carry out alpha-bend executions of intermediate language data that have a nest structure.

By the aforementioned method, alpha-blend executions are efficiently carried out over nest levels.

By this embodiment, alpha-blend executions are carried out with intermediate language data that have a nest structure, and then the intermediate language data are converted to bitmap data, and a printer performs printing with the bitmap data.

By this embodiment, the image processing apparatus identifies canvases that are opaque and unnecessary to draw, and does not allocate a memory area for the canvases, and does not carry out drawing processes for the canvases. Therefore, drawing processes are carried out at high speed with high memory efficiency.

Embodiment 4

In the following part, an image processing apparatus according to Embodiment 4 of this invention will be explained.

The image processing apparatus according to Embodiment 4 has the same components as those in the image processing apparatus according to Embodiment 3. However, the canvas checking unit 3-4-1, the memory area calculating unit 3-4-2 and the drawing unit 3-5 operates as follows.

The canvas checking unit 3-4-1 memorises a transparency setting in drawing data input to the drawing data processor unit 3-4 if the drawing data have the transparency setting. The transparency setting is memorised in association with a page. The transparency setting includes a degree of transparency of a canvas, a degree of transparency of a drawing object's color, OpacityMask, etc. Upon receiving an inquiry from the drawing data processor unit 3-4, the canvas checking unit 3-4-1 returns information on whether or not the transparency setting is in the drawing data input at the time of the inquiry.

The memory area calculating unit 3-4-2 calculates a size of a memory area required to maintain data of a canvas.

The drawing unit 3-5 is a functional unit that generate bitmap data on a VRAM (i.e. drawing memory) from the display list (i.e. intermediate language data) generated by the drawing data processor unit 3-4. The alpha-blend execution is carried out in this drawing unit 3-5.

In Step S504 in FIG. 13, the drawing data processor unit 3-4 generates a display list (i.e. drawing instructions in an intermediate language) based on information supplied from the data analyser unit 3-3. If the instruction is an instruction of a transparency setting, then the drawing data processor unit 3-4 provides content of the instruction to the canvas checking unit 3-4-1. The canvas checking unit 3-4-1 determines whether or not the transparency setting indicates a degree of transparency other than transparent and opaque, that is, the transparency setting indicates translucent, and memorises information on whether or not the transparency setting indicates translucent. Specifically, it memorises information on whether or not a translucent drawing object is generated.

In Step S507, the drawing data processor unit 3-4 inquires of the canvas checking unit 3-4-1 whether or not a page currently processed has a drawing object of which a degree of transparency indicates translucent. In Step S508, the drawing data processor unit 3-4 notifies the drawing unit 3-5 of whether the page has a drawing object of which a degree of transparency indicates translucent.

In Step S509, the drawing unit 3-5 optimally generates bitmap data from the display list according to information obtained in Steps S507 and S508. When processing a canvas, the drawing unit 3-5 generates bitmap data of all drawing objects directly on the VRAM (i.e. page memory) if the canvas is an "extrinsic canvas." If the canvas is an "intrinsic canvas," then the drawing unit 3-5 generates bitmap data with using a memory area required for a blend process shown in FIGS. 3A and 3B.

Figure 14:
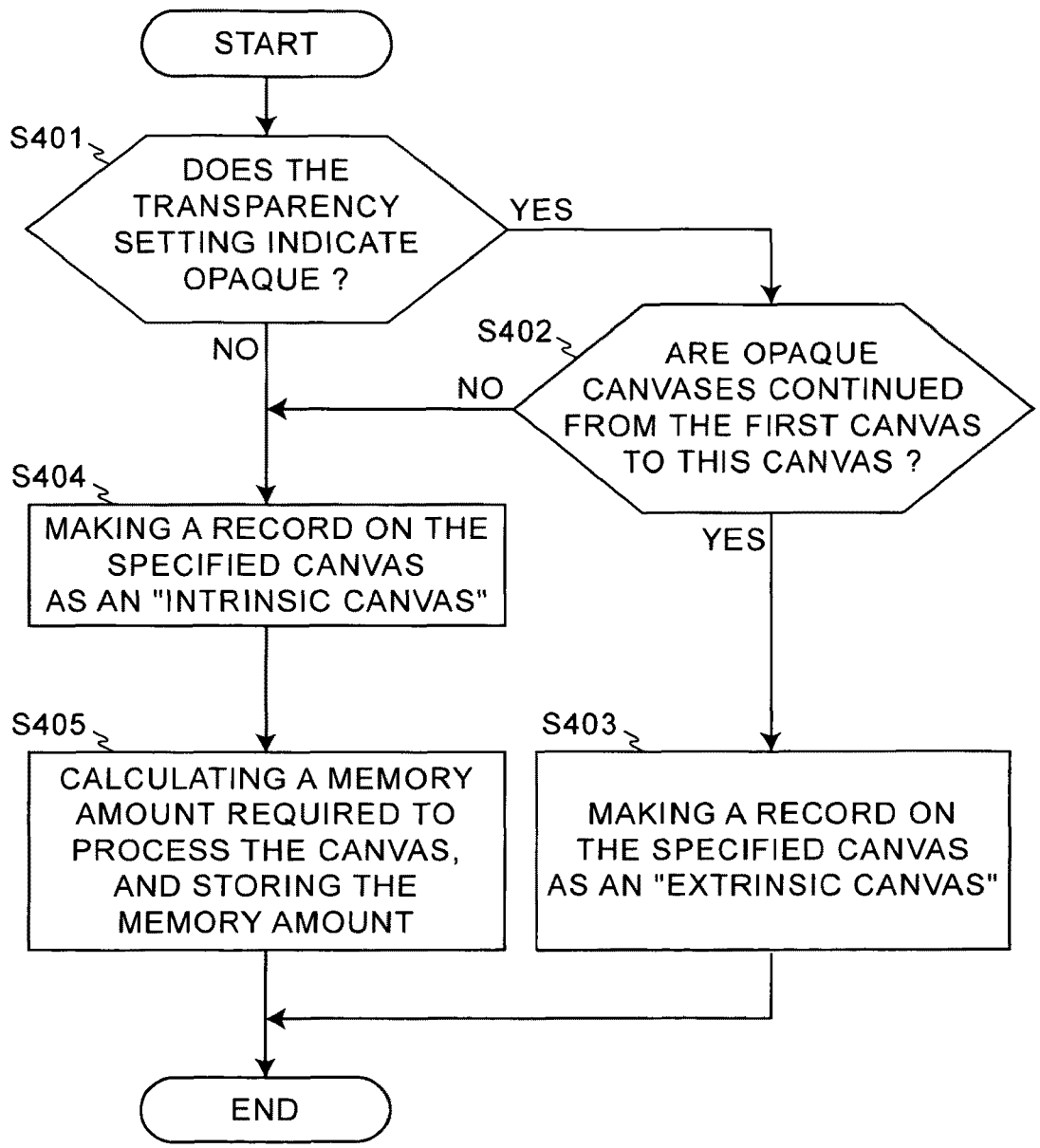
FIG. 14 shows a flowchart that indicates a detailed process of Step S504 in FIG. 13, performed in Embodiment 4.

FIG. 14 shows a flowchart that indicates a detailed process of Step S504 in FIG. 13.

Step S401:

The canvas checking unit 3-4-1 determines whether or not a transparency setting of the specified canvas indicates opaque.

Step S402:

If a transparency setting of the specified canvas indicates opaque, then the canvas checking unit 3-4-1 determines whether or not all canvases from the first canvas to this canvas are opaque, and determines whether or not the canvas is one in a series of continuous opaque canvases from the first canvas.

Step S403:

If the canvas is one in a series of continuous opaque canvases from the first canvas, then a canvas checking unit 3-4-1 memorises information that the specified canvas is an "extrinsic canvas" as information on the canvas.

Step S404:

If the canvas is not any one in a series of continuous opaque canvases from the first canvas, then a canvas checking unit 3-4-1 memorises information that the specified canvas is an "intrinsic canvas" as information on the canvas.

Step S405:

The memory area calculating unit 3-4-2 calculates a size of a memory area for a canvas, and memorises the size.

Advantages of Embodiment 4

In Embodiment 4, when the apparatus composes transparency properties of drawing objects and canvases in a nest structure described in a page description language such as an XML extended format (e.g. XPS), that is, the apparatus carries out an alpha-blend execution, to efficiently carry out an alpha-blend execution, the apparatus converts page description language data having the nest structure to intermediate language data with maintaining the nest structure. By the recursive algorithm, the apparatus can carry out alpha-bend executions of intermediate language data that have a nest structure.

By the aforementioned method, alpha-blend executions are efficiently carried out over nest levels.

By this embodiment, alpha-blend executions are carried out with intermediate language data that have a nest structure, and then the intermediate language data are converted to bitmap data, and a printer performs printing with the bitmap data.

In this embodiment, the image processing apparatus determines whether or not the specified canvas is opaque and the canvas is one in a series of continuous opaque canvases from the first canvas. Therefore, canvases are classified into canvases that requires a memory area for processing themselves and canvases that are directly drawn on a page memory, and consequently, the processes are carried out at high speed with high memory efficiency.

Embodiment 5

In the following part, an image processing apparatus according to Embodiment 5 of this invention will be explained.

[Configuration]

Figure 15:
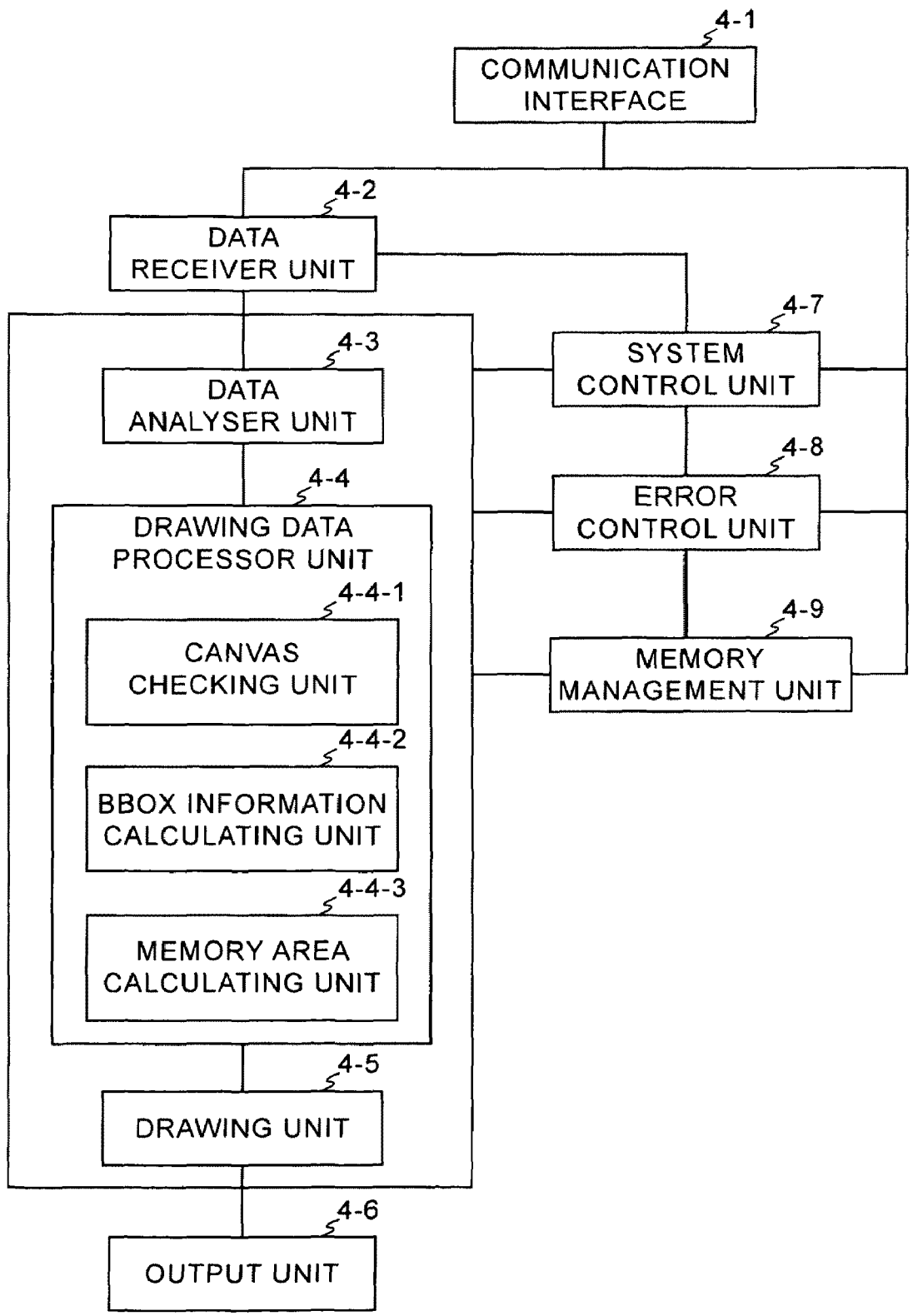
FIG. 15 shows a functional block diagram of an image processing apparatus in Embodiment 5 of this invention.

FIG. 15 shows a functional block diagram of an image processing apparatus in Embodiment 5 of this invention. The image processing apparatus has functional units such as a communication interface 4-1, a data receiver unit 4-2, a data analyser unit 4-3, a drawing data processor unit 4-4 (instance of an intermediate language converter unit), a canvas checking unit 4-4-1, a BBOX information calculating unit 4-4-2 (instance of a drawing area calculating unit), a memory area calculating unit 4-4-3, a drawing unit 4-5 (instance of an alpha-blend execution unit), an output unit 4-6, a system control unit 4-7, an error control unit 4-8, and a memory management unit 4-9. In the following part, the functional blocks are explained.

The communication interface 4-1 is a functional unit that communicates with a host computer, or the like.

The data receiver unit 4-2 is a functional unit that receives data (print data described in a page description language) via the communication interface 4-1.

The data analyser unit 4-3 is a functional unit that analyses the print data described in a page description language.

The drawing data processor unit 4-4 converts the print data (i.e. page description language data) to intermediate language data according to instructions from the data analyser unit 4-3. Here, the intermediate language data is a display list, for example.

The page description language data described in a page description language such as XPS as an XML extended format have an element of a drawing object such as path, glyph (font), or image, and also have a canvas as a basis on which the drawing object is displayed. The element and the canvas may have respective transparency properties. Further, the canvas may have a nest structure, and may contain a group that consists of one or more canvases and/or one or more elements in the nest structure.

The drawing data processor unit 4-4 converts the canvas data that have a nest structure to intermediate language data with maintaining the nest structure. FIG. 5 shows a data structure of a display list that has been converted from one canvas object.

The canvas object starts at a "Start" mark that indicates the beginning of the canvas, and has a display list of a drawing object or a canvas object on the canvas next to the "Start" mark, and an "End" mark that indicates the end of the canvas, and has a transparency information of the canvas next to the "End" mark, and ends at "Write" command that instructs a drawing process of the canvas to a lower layer.

If the canvas has a nest structure, then a pointer to a nested canvas object is inserted between the "Start" mark and the "End" mark.

The canvas checking unit 4-4-1, the BBOX (Bounding Box) information calculating unit 4-4-2, and the memory area calculating unit 4-4-3 are functional units that specifies a rectangle area to reduce a drawing area to be processed in order to reduce a required memory area and to carry out processes at high speed in an alpha-blend execution. Detailed operation of these functional units will be explained in "Reduction of a memory area for an alpha-blend execution" mentioned below.

The drawing unit 4-5 is a functional unit that generates bitmap data on a VRAM from the display list (i.e. intermediate language data) generated by the drawing data processor unit 4-4. The alpha-blend execution is carried out in this drawing unit 4-5. The canvas checking unit 4-4-1, the BBOX information calculating unit 4-4-2, and the memory area calculating unit 4-4-3 derive a drawing area for which the executions are required, and the drawing unit 4-5 carries out an alpha-blend execution and bitmap data generation only for the derived drawing area.

The data analyser unit 4-3, the drawing data processor unit 4-4, and the drawing unit 4-5 are embodied by executing an image processing program with a computer. This image processing program has been stored in a recording medium in the image processing apparatus. Further, the image processing program may have been stored in a portable recording medium, and may be install from the portable recording medium to this image processing apparatus.

The output unit 4-6 is a functional unit that outputs the bitmap data generated by the aforementioned functional units. Here, outputting may be printing on a medium such as paper or displaying on a display device.

The system control unit 4-7 is a functional unit that manages common information on system components in the image processing apparatus, and controls the system components.

The error control unit 4-8 is a functional unit that controls a process carried out when an error occurs in the image processing apparatus.

The memory management unit 4-9 is a functional unit that manages a memory in the image processing apparatus.

[Instance of a Canvas with Coordinate Values]

Although coordinate values are not attached to the canvases in the aforementioned instance shown in FIG. 6A, coordinate values may be attached to a canvas.

The next part shows an instance of a canvas described in XPS, and in Canvas, an image "/Resources/R16LY_NN.png" is specified and its coordinate values are specified with Viewbox and Viewport.

```
<Canvas>
    <Canvas.OpacityMask>
        <ImageBrush ImageSource="/Resources/R16LY_NN.png"
  Viewbox="0,0,128,96" ViewboxUnits="Absolute"
  Viewport="0,0,128,128" ViewportUnits="Absolute"
  TileMode="None" />
    </Canvas.OpacityMask>
    <Path Fill="#FFFF0000" Data="M 50,50 L 150,50 L
  150,25 L 50,250 Z"/>
</Canvas>
```

[Reduction of a Memory Area for an Alpha-Blend Execution]

When a printer carries out a blend process in a drawing process, 8 bits are required for each element of (R, G, B, alpha), and therefore, color information of 32 bits is required for one pixel. As mentioned above, if a canvas having a transparency property is used, a memory area is required to maintain a drawing result of a drawing process on the canvas.

In general, in a drawing process by a printer, a page is divided into bands with taking memory usage into account, and a figure is drawn band by band. Therefore, a memory area for a band is sufficient for the memory area required to maintain a drawing result. In case of an image for A4 size of a paper sheet, if the height of a band is 200 lines, then a memory area of about 3.8 Mbytes is required for this band.

In such drawing system, if rectangle coordinate information (i.e. Bounding Box: BBOX) is derived from coordinate values of one or more objects drawn on a canvas, and a memory area is allocated for only the rectangle area specified by the rectangle coordinate information, then a memory area required to maintain a drawing result is reduced. In the following part, reduction of a required memory area is explained.

In the image processing apparatus of Embodiment 5, the drawing data processor unit 4-4 calculates a size of a memory area minimally required for processing transparency executions for each band. The size is calculated from an object to be drawn in each band.

If the drawing unit 4-5 processes band by band in a page, then a drawing process can be done for the page by using a memory area with the maximum size of all bands.

In Embodiment 5, the drawing data processor unit 4-4 contains the canvas checking unit 4-4-1, the BBOX information calculating unit 4-4-2, and the memory area calculating unit 4-4-3.

The canvas checking unit 4-4-1 memorises a canvas setting in drawing data input to the drawing data processor unit 4-4 if the drawing data have the canvas setting. The canvas setting specifies a canvas, and is memorised in association with a page. The canvas checking unit 4-4-1 checks a transparency property of the current canvas, and determines whether or not all canvases from the first canvas to the current canvas are opaque, and then determines whether the current canvas is opaque and is one in a series of continuous opaque canvases from the first canvas. If the current canvas is opaque and is one in a series of continuous opaque canvases from the first canvas, then this canvas will be drawn directly on the VRAM, and information that the current canvas is considered as an "extrinsic canvas" is memorised as information on the current canvas. If the current canvas is not an "extrinsic canvas," then information that the current canvas is considered as an "intrinsic canvas" is memorised as information on the current canvas.

Upon receiving a drawing instruction in the drawing data processor unit 4-4, the BBOX information calculating unit 4-4-2 determines whether or not the current canvas in the canvas checking unit 4-4-1 is an "intrinsic canvas." If the current canvas is an "intrinsic canvas," then the BBOX information calculating unit 4-4-2 calculates BBOX information from coordinate values of one or more drawing objects to be drawn.

The memory area calculating unit 4-4-3 calculates a size of a memory area for processing a canvas in the drawing unit 4-5. For an "extrinsic canvas," the size is zero. For an "intrinsic canvas," the memory area calculating unit 4-4-3 calculates a size of a memory area for processing each band. The size is calculated from the BBOX information derived by the BBOX information calculating unit 4-4-2.

By the aforementioned method, an alpha-blend execution is carried out for only a part of a band limited by the rectangle area necessary to be processed, rather than all parts of a band.

Advantages of Embodiment 5

In Embodiment 5, when the apparatus composes transparency properties of drawing objects and canvases in a nest structure described in a page description language such as an XML extended format (e.g. XPS), that is, the apparatus carries out an alpha-blend execution, to efficiently carry out an alpha-blend execution, the apparatus converts page description language data having the nest structure to intermediate language data with maintaining the nest structure. By the recursive algorithm, the apparatus can carry out alpha-bend executions of intermediate language data that have a nest structure.

By the aforementioned method, alpha-blend executions are efficiently carried out over nest levels.

By this embodiment, alpha-blend executions are carried out with intermediate language data that have a nest structure, and then the intermediate language data are converted to bitmap data, and a printer performs printing with the bitmap data.

In this embodiment, for an alpha-blend execution, the image processing apparatus specifies a rectangle drawing area on which one or more objects are drawn on a canvas that has a transparency property, and does not maintain data outside of the rectangle drawing area and does not carry out a drawing process outside of the rectangle drawing area. Consequently, an alpha-blend execution and a drawing process are carried out at high speed with high memory efficiency.

In view of the embodiments described above, some aspects of the present invention are summarized as follows.

An image processing apparatus according to the first aspect of this invention contains:

an alpha-blend execution unit that allocates a memory area in a main memory for an alpha-blend execution to compose transparency properties and carries out the alpha-blend execution in a process to convert a page description language data to an image, the page description language data containing a drawing object having a transparency property and a canvas having a transparency property, the drawing object drawn on the canvas; and a storage device management unit that evacuates memory-image of the canvas in the memory area from the main memory to an auxiliary memory, and reads back the memory-image of the canvas from the auxiliary memory to the main memory when the memory-image of the canvas is required for the alpha-blend execution.

Here, the main memory is a primary memory device such as S-RAM or D-RAM capable of high speed access, and the auxiliary memory is a secondary memory device such as flash memory or magnetic disc that has a large data capacity and runs at relatively low speed.

Therefore, when converting page description language data that contain canvases having transparency properties and engaging overlap in layers, the main memory is not tight; and since a canvas layer is read back to the main memory when the canvas layer is required for carrying out an alpha-blend execution, memory overflow does not occur when converting.

The image processing apparatus according to the first aspect of this invention may further contain:

an intermediate language converter unit that converts the page description language data in which the canvases are in a nest structure to intermediate language data with maintaining the nest structure. The alpha-blend execution unit composes the transparency properties based on the intermediate language data maintaining the nest structure.

Therefore, even if canvases in layers in a nest structure engage overlap, memory overflow does not occur when converting.

In the image processing apparatus according to the first aspect of this invention, the page description language data may be described in an XML extended format.

Therefore, even if the page description language data are described in an XML extended format, memory overflow does not occur when converting.

In a computer-readable recording medium according to the first aspect of this invention, an image processing program is stored. The image processing program instructs a computer to function as:

an alpha-blend execution unit that allocates a memory area in a main memory for an alpha-blend execution to compose transparency properties and carries out the alpha-blend execution in a process to convert a page description language data to an image, the page description language data containing a drawing object having a transparency property and a canvas having a transparency property, the drawing object drawn on the canvas; and a storage device management unit that evacuates memory-image of the canvas in the memory area from the main memory to an auxiliary memory, and reads back the memory-image of the canvas from the auxiliary memory to the main memory when the memory-image of the canvas is required for the alpha-blend execution.

An image processing apparatus according to the second aspect of this invention contains:

a transparency setting checking unit that identifies transparency properties of canvases in a process to convert a page description language data to an image, the page description language data containing drawing objects having transparency properties and canvases having transparency properties, the drawing objects drawn on the canvases; and a drawing unit that allocates a memory area for an alpha-blend execution to compose the transparency properties and carries out the alpha-blend execution if any of the transparency properties of the canvases indicates transparent or translucent, and carries out a drawing process directly to a page memory without allocating a memory area for the alpha-blend execution if all of the transparency properties indicate opaque.

Here, a "canvas" means an object as a basis on which a drawing object (i.e. path, font, image, or the like) is drawn, and has transparency value that indicates a degree of transparency, and a transparency property such as transparency mask that has a transparency distribution.

Further, "transparent" means that a degree of transparency is zero, "opaque" means that a degree of transparency is 1.0, and "translucent" means that a degree of transparency is less than 1.0 and more than 0.

Therefore, if all canvases are opaque, then an alpha-blend execution is not carried out to compose transparency properties without allocating a memory area for that, and a drawing process is carried out directly to a drawing memory. Consequently, converting page description language data to a bitmap image is carried out at high speed with high memory efficiency.

In the image processing apparatus according to the second aspect of this invention, the page description language data may be described in an XML extended format.

Therefore, converting page description language data described in an XML extended format such as XPS to a bitmap image can be carried out at high speed with high memory efficiency.

In a computer-readable recording medium according to the second aspect of this invention, an image processing program is stored. The image processing program instructs a computer to function as:

a transparency setting checking unit that identifies transparency properties of canvases in a process to convert a page description language data to an image, the page description language data containing drawing objects having transparency properties and canvases having transparency properties, the drawing objects drawn on the canvases; and a drawing unit that allocates a memory area for an alpha-blend execution to compose the transparency properties and carries out the alpha-blend execution if any of the transparency properties of the canvases indicates transparent or translucent, and carries out a drawing process directly to a page memory without allocating a memory area for the alpha-blend execution if all of the transparency properties indicate opaque.

An image processing apparatus according to the third aspect of this invention contains:

a canvas checking unit that identifies a canvas that does not have any drawing objects thereon and a transparency property thereof indicates opaque in a process to convert a page description language data to an image, the page description language data containing drawing objects having transparency properties and canvases having transparency properties, the drawing objects drawn on the canvases; and a drawing data converter unit that excludes the canvas identified by the canvas checking unit from the canvases in the page description language data to be converted to an image.

Here, a "canvas" means an object as a basis on which a drawing object (i.e. path, font, image, or the like) is drawn, and has transparency value that indicates a degree of transparency, and a transparency property such as transparency mask that has a transparency distribution.

Further, "opaque" means that a degree of transparency is 1.0.

Therefore, by excluding an opaque canvas that formally exists in page description language data but has no drawing objects thereon, the processing time for converting is reduced with high memory efficiency.

In the image processing apparatus according to the third aspect of this invention, the drawing data converter unit may not allocate a memory area of an alpha-blend execution to compose transparency properties for the canvas identified by the canvas checking unit. Therefore, memory efficiency can be higher.

The image processing apparatus according to the third aspect of this invention may further contain:

an intermediate language converter unit that converts the page description language data in which canvases are in a nest structure to intermediate language data with maintaining the nest structure. This intermediate language converter unit excludes the canvas identified by the canvas checking unit from the canvases in the page description language data when the intermediate language converter unit converts the page description language data to the intermediate language data.

Therefore, by excluding unnecessary canvases when converting page description language data to intermediate language data, the processing time for converting can be reduced with high memory efficiency.

The image processing apparatus according to the third aspect of this invention may further contain:

an intermediate language converter unit that converts the page description language data in which canvases are in a nest structure to intermediate language data with maintaining the nest structure; and a drawing data processor unit that converts the intermediate language data to bitmap data. This drawing data processing unit excludes the canvas identified by the canvas checking unit from the canvases when the drawing data processing unit converts the intermediate language data to bitmap data.

Therefore, by excluding unnecessary canvases when converting intermediate language data to bitmap data, the processing time for converting can be reduced with high memory efficiency.

In the image processing apparatus according to the third aspect of this invention, the page description language data may be described in an XML extended format.

Therefore, it is possible to exclude unnecessary canvases in page description language data described in XPS or the like.

In a computer-readable recording medium according to the third aspect of this invention, an image processing program is stored. The image processing program instructs a computer to function as:

a canvas checking unit that identifies a canvas that does not have any drawing objects thereon and a transparency property thereof indicates opaque in a process to convert a page description language data to an image, the page description language data containing drawing objects having transparency properties and canvases having transparency properties, the drawing objects drawn on the canvases; and a drawing data converter unit that excludes the canvas identified by the canvas checking unit from the canvases in the page description language data to be converted to an image.

An image processing apparatus according to the fourth aspect of this invention contains:

a canvas checking unit that determines whether or not a transparency property of a canvas indicates opaque, and considers each canvas in a series of continuous opaque canvases from the first canvas to be an "extrinsic canvas," and considers a canvas other than the opaque canvases to be an "intrinsic canvas," in a process to convert a page description language data to an image, the page description language data containing drawing objects having transparency properties and canvases having transparency properties, the drawing objects drawn on the canvases; and a drawing unit that carries out a drawing process directly to a page memory for drawing to the "extrinsic canvas," and carries out a drawing process with an alpha-blend execution for drawing to the "intrinsic canvas."

Here, a "canvas" means an object as a basis on which a drawing object (i.e. path, font, image, or the like) is drawn, and has transparency value that indicates a degree of transparency, and a transparency property such as transparency mask that has a transparency distribution.

Further, "opaque" means that a degree of transparency is 1.0.

Therefore, since each canvas in a series of continuous opaque canvases is drawn directly to a page memory without alpha-blend executions, the processing time for converting is reduced with high memory efficiency.

The image processing apparatus according to the fourth aspect of this invention may further contain:

an intermediate language converter unit that converts the page description language data in which the canvas has a nest structure to intermediate language data with maintaining the nest structure. The drawing unit carries out the alpha-blend execution based on the intermediate language data with maintaining the nest structure.

Therefore, continuous opaque canvases in a nest structure described in intermediate language can be processed with a recursive algorithm.

In the image processing apparatus according to the fourth aspect of this invention, the page description language data may be described in an XML extended format.

Therefore, for continuous opaque canvases from the first canvas in page description language such as XPS, the processing time for converting is reduced.

In a computer-readable recording medium according to the forth aspect of this invention, an image processing program is stored. The image processing program instructs a computer to function as:

a canvas checking unit that determines whether or not a transparency property of a canvas indicates opaque, and considers each canvas in a series of continuous opaque canvases from the first canvas to be an "extrinsic canvas," and considers a canvas other than the opaque canvases to be an "intrinsic canvas," in a process to convert a page description language data to an image, the page description language data containing drawing objects having transparency properties and canvases having transparency properties, the drawing objects drawn on the canvases; and a drawing unit that carries out a drawing process directly to a page memory for drawing to the "extrinsic canvas," and carries out a drawing process with an alpha-blend execution for drawing to the "intrinsic canvas."

An image processing apparatus according to the fifth aspect of this invention contains:

a drawing area calculating unit that calculates coordinate information on a rectangle area where a drawing object and a canvas are drawn from coordinate values of the drawing object and the canvas, in a process to convert a page description language data to an image, the page description language data containing a drawing object having a transparency property and a canvas having a transparency property, the drawing object drawn on the canvas; and a drawing unit that carries out composition of the transparency properties only in the rectangle area specified by the coordinate information.

Here, a "canvas" means an object as a basis on which a drawing object. (i.e. path, font, image, or the like) is drawn, and has transparency value that indicates a degree of transparency, and a transparency property such as transparency mask that has a transparency distribution.

Therefore, since composing transparency properties is carried out on only canvases having transparency properties, the processing time for composing transparency properties is reduced with high memory efficiency.

In the image processing apparatus according to the fifth aspect of this invention, the drawing unit may carry out a drawing process only in the rectangle area specified by the coordinate information.

Therefore, not only the processing time for composing transparency properties but also the required time for a drawing process can be reduced.

The image processing apparatus according to the fifth aspect of this invention may further contain:

a canvas checking unit that determines whether or not a transparency property of a canvas indicates opaque, and considers each canvas in a series of continuous opaque canvases in a nest structure to be an "extrinsic canvas," and considers a canvas other than the opaque canvases to be an "intrinsic canvas." The drawing area calculating unit calculates the coordinate information on the rectangle area from coordinate values of the "intrinsic canvas."

Therefore, since it is not necessary to maintain a transparency property of the "extrinsic canvas," the processing time for composing transparency properties can be reduced with high memory efficiency.

The image processing apparatus according to the fifth aspect of this invention may further contain:

a memory area calculating unit that calculates a memory area size required for composition of transparency properties on a canvas. The memory area calculating unit determines that a memory area size required for composition of transparency properties on the "extrinsic canvas" is zero, and calculates a memory area size required for composition of transparency properties in the rectangle area as a memory area size required for composition of transparency properties on the "intrinsic canvas."

Therefore, it is possible to calculate a size of a memory area required for a transparency property execution, and a memory management unit can allocate the memory area of the size for the transparency property execution. Further, since this allocated memory area is smaller than that for a whole band, a size of remaining memory area available for another process can be identified in advance.

In a computer-readable recording medium according to the fifth aspect of this invention, an image processing program is stored. The image processing program instructs a computer to function as:

a drawing area calculating unit that calculates coordinate information on a rectangle area where a drawing object and a canvas are drawn from coordinate values of the drawing object and the canvas, in a process to convert a page description language data to an image, the page description language data containing a drawing object having a transparency property and a canvas having a transparency property, the drawing object drawn on the canvas; and a drawing unit that carries out composition of the transparency properties only in the rectangle area specified by the coordinate information.

An image processing apparatus according to the sixth aspect of this invention contains:

an intermediate language converter unit that converts page description language data in which a canvas having a transparency property exists in a nest structure to intermediate language data with maintaining the nest structure, in a process to convert the page description language data to the intermediate language data.

Here, a "canvas" means an object as a basis on which a drawing object (i.e. path, font, image, or the like) is drawn, and has transparency value that indicates a degree of transparency, and a transparency property such as transparency mask that has a transparency distribution.

Therefore, even if page description language data have canvases in a nest structure, page description language data can be converted to intermediate language data for printing or displaying. Thus, in an alpha-blend execution, composing color values and degrees of transparency set in the page description language data can be properly carried out.

The image processing apparatus according to the sixth aspect of this invention may further contain:

an alpha-blend execution unit that carries out composition of transparency properties of the canvas in the nest structure according to a recursive algorithm corresponding to the nest structure.

Here, composing color values according to a color value and a degree of transparency of a drawing object and a color value and a degree of transparency of a canvas is called as an alpha-blend.

Therefore, an alpha-blend execution of intermediate language data having a nest structure can be carried out with a simple algorithm, and composing color values and degrees of transparency set in the page description language data can be properly carried out.

In the image processing apparatus according to the sixth aspect of this invention, the page description language data may be described in an XML extended format.

Therefore, even if the page description language data are described in an XML extended format, in an alpha-blend execution, composing color values and degrees of transparency set in the page description language data can be properly carried out.

In a computer-readable recording medium according to the sixth aspect of this invention, an image processing program is stored. The image processing program instructs a computer to function as:

an intermediate language converter unit that converts page description language data in which a canvas having a transparency property exists in a nest structure to intermediate language data with maintaining the nest structure, in a process to convert the page description language data to the intermediate language data.

The description of the present invention has been presented for purposes of illustration and description, and is not intended to be exhaustive or limited to the invention in the form disclosed. Many modifications and variations will be apparent to those of ordinary skill in the art.

In the aforementioned embodiments, color values are based on three base colors RGB. Alternatively, color values may be based on CMYK base colors. Alpha-blend executions can also be carried out if color values are based on CMYK.

What is claimed is:

1. An image processing apparatus, comprising:
   an alpha-blend execution unit that allocates a memory area in a main memory for an alpha-blend execution to compose transparency properties and carries out the alpha-blend execution in a process to convert a page description language data to an image, the page description language data containing a drawing object having a transparency property and a canvas having a transparency property, the drawing object drawn on the canvas; and
   a storage device management unit that evacuates a memory-image of the canvas in the memory area from the main memory to an auxiliary memory, and reads back the memory-image of the canvas from the auxiliary memory to the main memory when the memory-image of the canvas is required for the alpha-blend execution.

2. The image processing apparatus according to claim 1, further comprising:
   an intermediate language converter unit that converts the page description language data in which canvases are in a nest structure to intermediate language data with maintaining the nest structure; and
   wherein the alpha-blend execution unit composes the transparency properties based on the intermediate language data maintaining the nest structure.

3. The image processing apparatus according to claim 1, wherein:
   the page description language data are described in an XML extended format.

4. A non-transitory computer-readable recording medium in which an image processing program is stored, wherein the image processing program instructs a computer to function as:

an alpha-blend execution unit that allocates a memory area in a main memory for an alpha-blend execution to compose transparency properties and carries out the alpha-blend execution in a process to convert a page description language data to an image, the page description language data containing a drawing object having a transparency property and a canvas having a transparency property, the drawing object drawn on the canvas; and a storage device management unit that evacuates memory-image of the canvas in the memory area from the main memory to an auxiliary memory, and reads back the memory-image of the canvas from the auxiliary memory to the main memory when the memory-image of the canvas is required for the alpha-blend execution.

5. An image processing apparatus, comprising:

a transparency setting checking unit that identifies transparency properties of canvases in a process to convert a page description language data to an image, the page description language data containing drawing objects having transparency properties and canvases having transparency properties, the drawing objects drawn on the canvases; and a drawing unit that allocates a memory area for an alpha-blend execution to compose the transparency properties and carries out the alpha-blend execution if any of the transparency properties of the canvases indicates transparent or translucent, and carries out a drawing process directly to a page memory without allocating a memory area for the alpha-blend execution if all of the transparency properties indicate opaque.

6. The image processing apparatus according to claim 5, wherein:

the page description language data are described in an XML extended format.

7. A non-transitory computer-readable recording medium in which an image processing program is stored, wherein the image processing program instructs a computer to function as:

a transparency setting checking unit that identifies transparency properties of canvases in a process to convert a page description language data to an image, the page description language data containing drawing objects having transparency properties and canvases having transparency properties, the drawing objects drawn on the canvases; and a drawing unit that allocates a memory area for an alpha-blend execution to compose the transparency properties and carries out the alpha-blend execution if any of the transparency properties of the canvases indicates transparent or translucent, and carries out a drawing process directly to a page memory without allocating a memory area for the alpha-blend execution if all of the transparency properties indicate opaque.

8. An image processing apparatus, comprising:

a canvas checking unit that identifies a canvas that does not have any drawing objects thereon and a transparency property thereof indicates opaque in a process to convert a page description language data to an image, the page description language data containing drawing objects having transparency properties and canvases having transparency properties, the drawing objects drawn on the canvases; and a drawing data converter unit that excludes the canvas identified by the canvas checking unit from the canvases in the page description language data to be converted to an image.

9. The image processing apparatus according to claim 8, wherein:

the drawing data converter unit does not allocate a memory area of an alpha-blend execution to compose transparency properties for the canvas identified by the canvas checking unit.

10. The image processing apparatus according to claim 8, further comprising:

an intermediate language converter unit that converts the page description language data in which canvases are in a nest structure to intermediate language data with maintaining the nest structure;

wherein the intermediate language converter unit excludes the canvas identified by the canvas checking unit from the canvases in the page description language data when the intermediate language converter unit converts the page description language data to the intermediate language data.

11. The image processing apparatus according to claim 8, further comprising:

an intermediate language converter unit that converts the page description language data in which canvases are in a nest structure to intermediate language data with maintaining the nest structure; and a drawing data processor unit that converts the intermediate language data to bitmap data;

wherein the drawing data processing unit excludes the canvas identified by the canvas checking unit from the canvases when the drawing data processing unit converts the intermediate language data to bitmap data.

12. The image processing apparatus according to claim 8, wherein:

the page description language data are described in an XML extended format.

13. A non-transitory computer-readable recording medium in which an image processing program is stored, wherein the image processing program instructs a computer to function as:

a canvas checking unit that identifies a canvas that does not have any drawing objects thereon and a transparency property thereof indicates opaque in a process to convert a page description language data to an image, the page description language data containing drawing objects having transparency properties and canvases having transparency properties, the drawing objects drawn on the canvases; and a drawing data converter unit that excludes the canvas identified by the canvas checking unit from the canvases in the page description language data to be converted to an image.

14. An image processing apparatus, comprising:

a canvas checking unit that determines whether or not a transparency property of a canvas indicates opaque, and considers each canvas in a series of continuous opaque canvases from the first canvas to be an "extrinsic canvas," and considers a canvas other than the opaque canvases to be an "intrinsic canvas," in a process to convert a page description language data to an image, the page description language data containing drawing objects having transparency properties and canvases having transparency properties, the drawing objects drawn on the canvases; and a drawing unit that carries out a drawing process directly to a page memory for drawing to the "extrinsic canvas," and carries out a drawing process with an alpha-blend execution for drawing to the "intrinsic canvas."

15. The image processing apparatus according to claim 14, further comprising:
an intermediate language converter unit that converts the page description language data in which the canvas has a nest structure to intermediate language data with maintaining the nest structure;
wherein the drawing unit carries out the alpha-blend execution based on the intermediate language data with maintaining the nest structure.

16. The image processing apparatus according to claim 14, wherein:
the page description language data are described in an XML extended format.

17. A non-transitory computer-readable recording medium in which an image processing program is stored, wherein the image processing program instructs a computer to function as:
a canvas checking unit that determines whether or not a transparency property of a canvas indicates opaque, and considers each canvas in a series of opaque canvases continuous from the first canvas to be an "extrinsic canvas," and considers a canvas other than the opaque canvases to be an "intrinsic canvas," in a process to convert a page description language data to an image, the page description language data containing drawing objects having transparency properties and canvases having transparency properties, the drawing objects drawn on the canvases; and
a drawing unit that carries out a drawing process directly to a page memory for drawing to the "extrinsic canvas," and carries out a drawing process with an alpha-blend execution for drawing to the "intrinsic canvas."

18. An image processing apparatus, comprising:
a drawing area calculating unit that calculates coordinate information on a rectangle area where a drawing object and a canvas are drawn from coordinate values of the drawing object and the canvas, in a process to convert a page description language data to an image, the page description language data containing a drawing object having a transparency property and a canvas having a transparency property, the drawing object drawn on the canvas; and
a drawing unit that carries out composition of the transparency properties only in the rectangle area specified by the coordinate information.

19. The image processing apparatus according to claim 18, wherein:
the drawing unit carry out a drawing process only in the rectangle area specified by the coordinate information.

20. The image processing apparatus according to claim 19, further comprising:
a canvas checking unit that determines whether or not a transparency property of a canvas indicates opaque, and considers each canvas in a series of continuous opaque canvases in a nest structure to be an "extrinsic canvas," and considers a canvas other than the opaque canvases to be an "intrinsic canvas;"
wherein the drawing area calculating unit calculates the coordinate information on the rectangle area from coordinate values of the "intrinsic canvas."

21. The image processing apparatus according to claim 20, further comprising:
a memory area calculating unit that calculates a memory area size required for composition of transparency properties on a canvas;
wherein the memory area calculating unit determines that a memory area size required for composition of transparency properties on the "extrinsic canvas" is zero, and calculates a memory area size required for composition of transparency properties in the rectangle area as a memory area size required for composition of transparency properties on the "intrinsic canvas."

22. A non-transitory computer-readable recording medium in which an image processing program is stored, wherein the image processing program instructs a computer to function as:
a drawing area calculating unit that calculates coordinate information on a rectangle area where a drawing object and a canvas are drawn from coordinate values of the drawing object and the canvas, in a process to convert a page description language data to an image, the page description language data containing a drawing object having a transparency property and a canvas having a transparency property, the drawing object drawn on the canvas; and
a drawing unit that carries out composition of the transparency properties only in the rectangle area specified by the coordinate information.

* * * * *